United States Patent
Iwashita

(10) Patent No.: US 11,038,872 B2
(45) Date of Patent: Jun. 15, 2021

(54) NETWORK DEVICE, INFORMATION PROCESSING APPARATUS, AUTHENTICATION METHOD, AND RECORDING MEDIUM

(71) Applicant: Shinya Iwashita, Kanagawa (JP)

(72) Inventor: Shinya Iwashita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 214 days.

(21) Appl. No.: 16/118,520

(22) Filed: Aug. 31, 2018

(65) Prior Publication Data

US 2019/0097993 A1    Mar. 28, 2019

(30) Foreign Application Priority Data

Sep. 27, 2017   (JP) .............................. JP2017-185918

(51) Int. Cl.
*H04L 29/06* (2006.01)
*G06F 21/60* (2013.01)
(Continued)

(52) U.S. Cl.
CPC ............ *H04L 63/083* (2013.01); *G06F 21/31* (2013.01); *G06F 21/608* (2013.01); *H04L 61/256* (2013.01); *H04L 63/166* (2013.01); *H04L 61/2514* (2013.01); *H04L 61/2517* (2013.01); *H04L 63/0281* (2013.01)

(58) Field of Classification Search
CPC ... H04L 63/083; H04L 61/256; H04L 63/166; G06F 21/608
See application file for complete search history.

(56) References Cited

U.S. PATENT DOCUMENTS 7,865,933 B2 *   1/2011   Osamura ................. H04L 63/08
                                                         726/2
9,742,760 B1 *   8/2017   Ou ........................ H04L 63/083
(Continued)

FOREIGN PATENT DOCUMENTS

JP         2006-011989          1/2006
JP         2007-148974          6/2007
(Continued)

*Primary Examiner* — Eleni A Shiferaw
*Assistant Examiner* — Stephanie S Ham
(74) *Attorney, Agent, or Firm* — Harness, Dickey & Pierce, P.L.C.

(57) ABSTRACT

A network device includes a plurality of network interfaces respectively connected to a plurality of authentication servers that reside on different communication networks; and circuitry to: in response to reception of an authentication request from an information processing apparatus, select one of the plurality of authentication servers to be a transmission destination of the authentication request, based on condition information associated with the plurality of network interfaces; transmit the authentication request to the selected authentication server using one of the plurality of networks associated with the selected authentication server, and control transmission of authentication information to the information processing apparatus, based on an authentication result received from the selected authentication server in response to the authentication request.

16 Claims, 22 Drawing Sheets

(51) Int. Cl.
  *H04L 29/12* (2006.01)
  *G06F 21/31* (2013.01)

(56) References Cited

U.S. PATENT DOCUMENTS

| | | | | |
|---|---|---|---|---|
| 10,003,968 B2* | 6/2018 | Higuchi | ................ | H04L 63/205 |
| 2010/0214585 A1* | 8/2010 | Tanji | ..................... | G06F 3/1213 |
| | | | | 358/1.12 |
| 2010/0306829 A1* | 12/2010 | Nishio | .................. | G06F 21/608 |
| | | | | 726/4 |
| 2011/0182183 A1* | 7/2011 | Perkins | ............... | H04L 61/1511 |
| | | | | 370/235 |
| 2012/0198534 A1* | 8/2012 | Ohta | ..................... | G06F 21/608 |
| | | | | 726/8 |
| 2016/0094488 A1* | 3/2016 | Chen | ....................... | H04L 45/66 |
| | | | | 370/401 |
| 2016/0261769 A1* | 9/2016 | Yamada | ................ | G06F 21/608 |
| 2018/0198762 A1* | 7/2018 | Cline | ................... | H04L 63/083 |

FOREIGN PATENT DOCUMENTS

| | | |
|---|---|---|
| JP | 2010-277185 | 12/2010 |
| JP | 2011-076635 | 4/2011 |
| JP | 2017-055372 | 3/2017 |

\* cited by examiner

FIG. 7

| AUTHENTICATION SERVER IP ADDRESS | INTERFACE USED | PRIORITY |
|---|---|---|
| 192.168.1.4 | NIC_A | 2 (HIGH) |
| 192.168.2.4 | NIC_B | 1 (LOW) |

| NETWORK INTERFACE NAME | MAC ADDRESS |
|---|---|
| NIC_A (XX:XX:XX:XX:XX:AI) | XX:XX:XX:XX:XX:AA (AUTHENTICATION SERVER 50a) |
| NIC_C (XX:XX:XX:XX:XX:CI) | XX:XX:XX:XX:XX:XX (INPUT/OUTPUT DEVICE 30) |

| IP ADDRESS BEFORE CONVERSION | IP ADDRESS AFTER CONVERSION |
|---|---|
| 192.168.1.5 (NETWORK DEVICE 10) | 192.168.2.4 (AUTHENTICATION SERVER 50b) |

| USER NAME | PASSWORD |
|---|---|
| taro | abcd |
| jiro | cdef |
| .... | .... |

| USER NAME | PASSWORD |
|---|---|
| hanako | bcde |
| kaori | defg |
| .... | .... |

43b

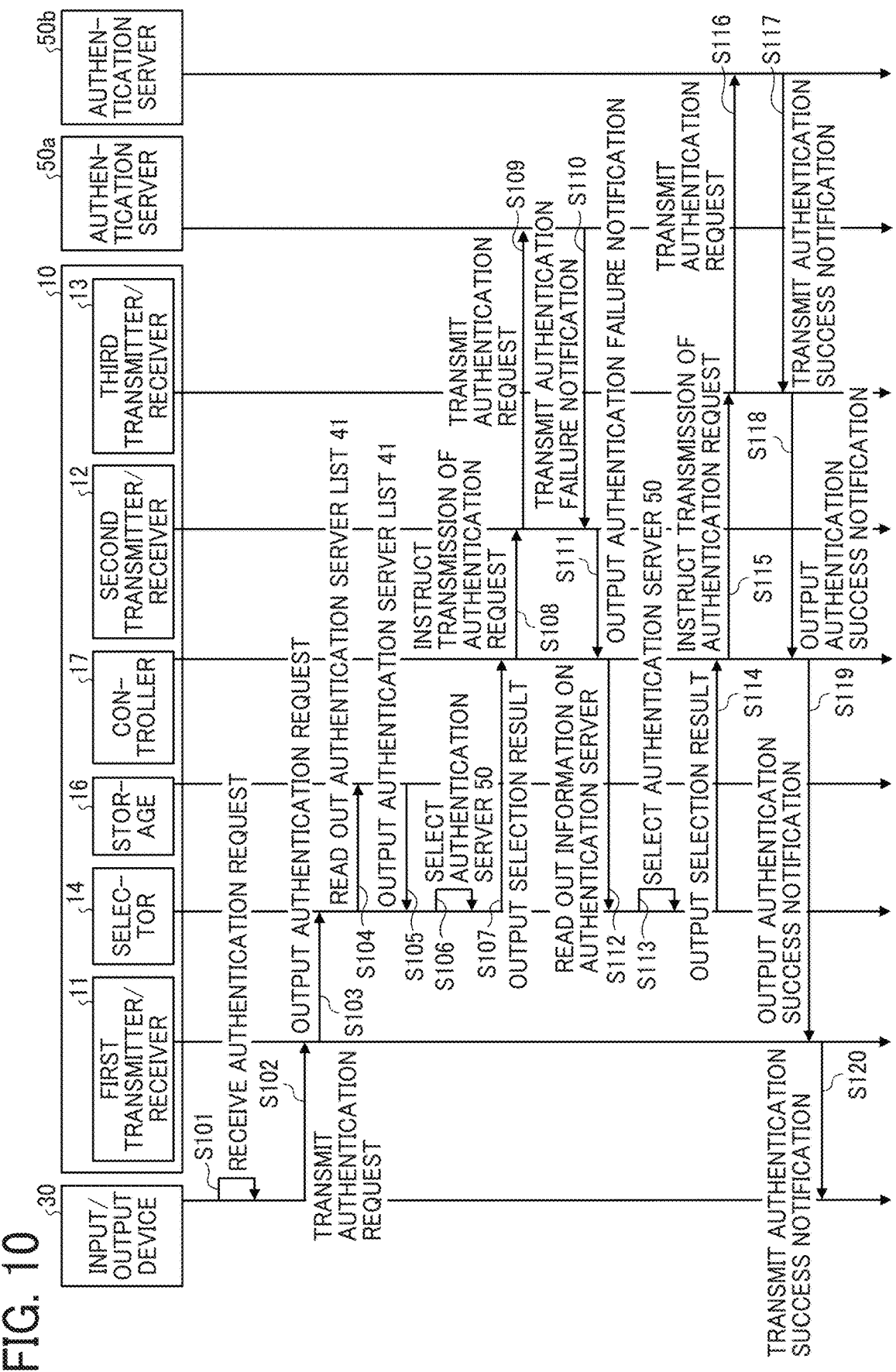

FIG. 13

| AUTHENTICATION SERVER IP ADDRESS | INTERFACE USED | CONFIDENTIALITY OF NETWORK |
|---|---|---|
| 192.168.1.4 | NIC_A | HIGH |
| 192.168.2.4 | NIC_B | LOW |

41a

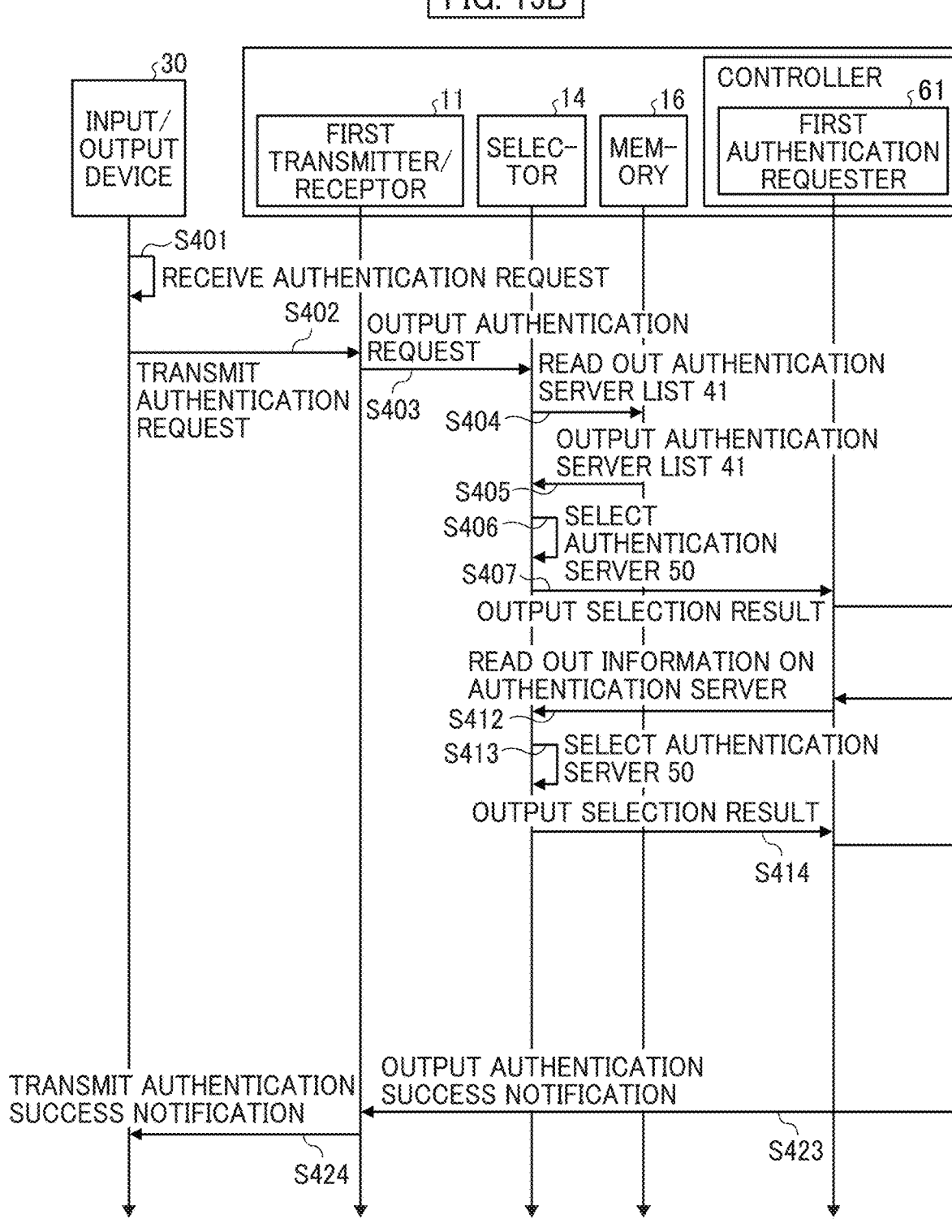

| USER NAME | AUTHENTICATION SERVER IP ADDRESS | INTERFACE USED |
|---|---|---|
| taro, jiro | 192.168.1.4 | NIC_A |
| hanako, kaori | 192.168.2.4 | NIC_B |
| (WHEN NOT EXIST IN LIST) | 192.168.1.4 | NIC_A |

FIG. 21A

| IP ADDRESS BEFORE CONVERSION | IP ADDRESS AFTER CONVERSION | PORT NUMBER BEFORE CONVERSION | PORT NUMBER AFTER CONVERSION |
|---|---|---|---|
| 192.168.1.5 (NETWORK DEVICE 10) | 192.168.1.4 (AUTHENTICATION SERVER 50a) | CCAA (NETWORK DEVICE 10) | XXAA (AUTHENTICATION SERVER 50a) |

| IP ADDRESS BEFORE CONVERSION | IP ADDRESS AFTER CONVERSION | PORT NUMBER BEFORE CONVERSION | PORT NUMBER AFTER CONVERSION |
|---|---|---|---|
| 192.168.2.5 (NETWORK DEVICE 10) | 192.168.2.4 (AUTHENTICATION SERVER 50b) | CCBB (NETWORK DEVICE 10) | XXBB (AUTHENTICATION SERVER 50b) |

44b

NETWORK DEVICE, INFORMATION PROCESSING APPARATUS, AUTHENTICATION METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2017-185918, filed on Sep. 27, 2017, in the Japan Patent Office, the entire disclosure of which is hereby incorporated by reference herein.

BACKGROUND

Technical Field

The present invention relates to a network device, an information processing apparatus, an authentication method, and a recording medium.

Description of Related Art

In a network system configured in an organization like a company, a plurality of different networks may exist. In such case, devices on different networks communicate with each other via, for example, network devices, such as routers. In some cases, it may be desirable to restrict communication between devices on different networks. For example, in an Office Automation network, a network for transmitting highly confidential information such as personal information, and a network for transmitting information that is less confidential such as sales or personnel affairs data may exist together. In such case, an authentication device performing user authentication is provided in each network, such that only devices that are authenticated by the authentication device on a particular network are allowed to communicate with other devices on that network.

SUMMARY

Example embodiments of the present invention include a network device including a plurality of network interfaces respectively connected to a plurality of authentication servers that reside on different communication networks; and circuitry to: in response to reception of an authentication request from an information processing apparatus, select one of the plurality of authentication servers to be a transmission destination of the authentication request, based on condition information associated with the plurality of network interfaces; transmit the authentication request to the selected authentication server using one of the plurality of networks associated with the selected authentication server, and control transmission of authentication information to the information processing apparatus, based on an authentication result received from the selected authentication server in response to the authentication request.

BRIEF DESCRIPTION OF THE SEVERAL VIEWS OF THE DRAWINGS

The accompanying drawings are intended to depict embodiments of the present invention and should not be interpreted to limit the scope thereof. The accompanying drawings are not to be considered as drawn to scale unless explicitly noted.

FIG. 7 is a diagram illustrating an example of an authentication server list according to the first embodiment;

FIGS. 8A and 8B are diagrams illustrating examples of address lists according to the first embodiment;

FIGS. 9A and 9B are diagrams illustrating examples of authentication tables according to the first embodiment;

FIG. 10 is a sequence diagram illustrating an example of an authentication process performed by the network system according to the first embodiment;

FIG. 13 is a diagram illustrating an example of the authentication server list according to a modification of the first embodiment;

FIGS. 15A and 15B (FIG. 15) are a sequence diagram illustrating an example of an authentication process, performed by the network system, according to the second embodiment;

FIG. 18 is a diagram illustrating an example of an authentication server list according to a third embodiment:

FIGS. 21A and 21B (FIG. 21) are diagrams illustrating an example of an address list according to the alternative embodiment.

DETAILED DESCRIPTION

Figure 1:
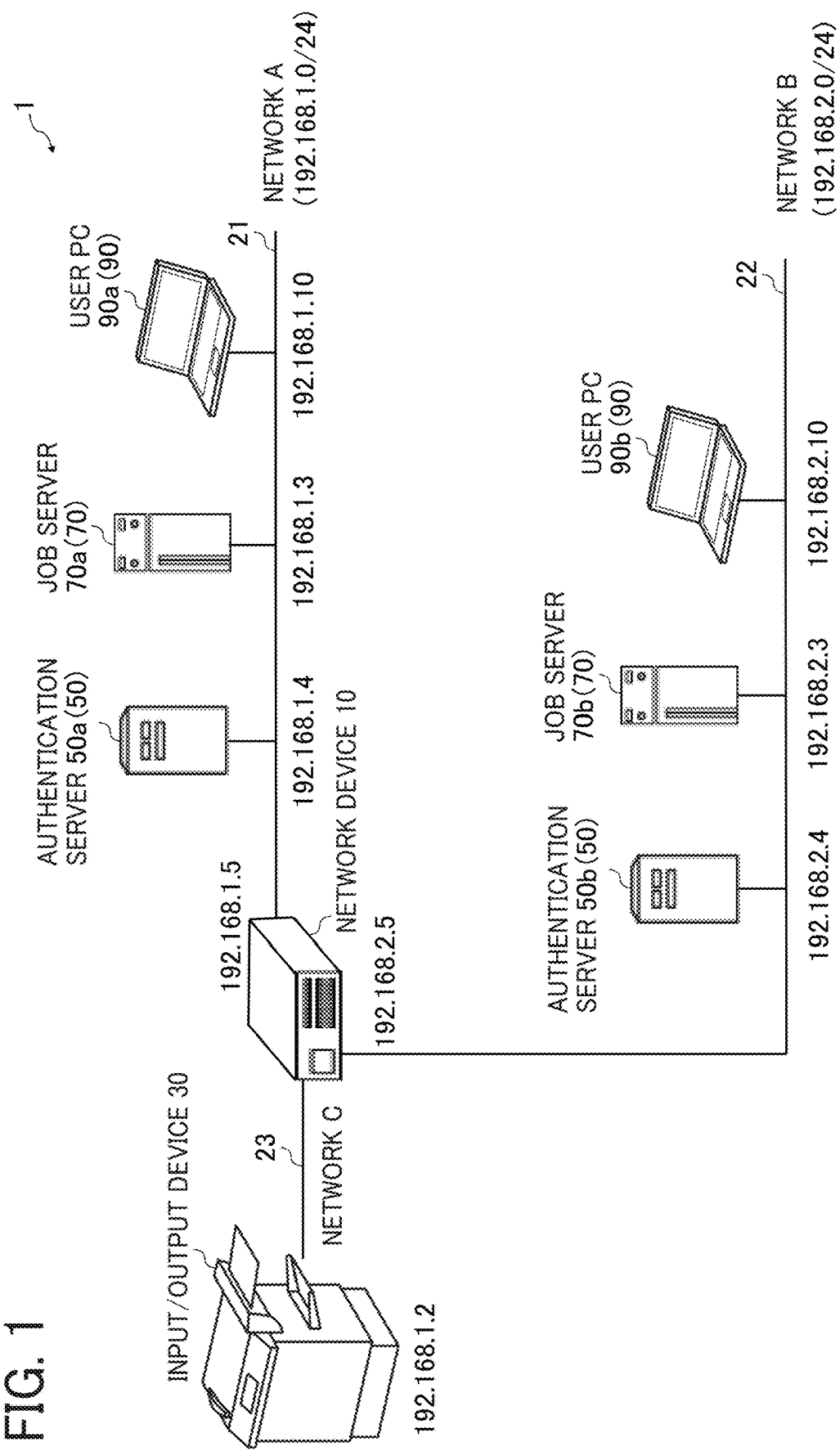
FIG. 1 is a diagram illustrating an example of a configuration of a network system according to one or more embodiments.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments to implement the invention are described with reference to the drawings. The same components are denoted by the same reference numerals in the description of the drawings and no repeated description is provided.

Entire Configuration of System

FIG. 1 is a diagram illustrating an example of a configuration of a network system 1 according to an embodiment. With an authentication server 50 provided on each communication network, security of each communication network is kept high, even if a user operating an input/output device 30 tries to connect to other device on each communication network. The network system 1 includes a network device 10, the input/output device 30, the authentication server 50, a job server 70 and a user PC 90.

The network device 10 controls communication between devices that reside on different communication networks. The network device 10 includes a plurality of network interfaces (I/F), which allow communication with external devices on different communication networks.

In the example illustrated in FIG. 1, the network device 10 has three network I/Fs. The network device 10 can communicate with each of an authentication server 50a, a job server 70a, and a user PC 90a via a network A 21. The network device 10 can communicate with each of an authentication server 50b, a job server 70b, and a user PC 90b via a network B 22. An Internet Protocol (IP) address in the network A 21 of the network device 10 is "192.168.1.5" and an IP address in the network B 22 of the network device 10 is "192.168.2.5."

The network device 10 can also communicate with the input/output device 30, such as a printer, via a network C 23. The network device 10 has no IP address in the network C 23. This is because the network I/F connected to the network C 23 of the network device 10 needs merely to provide an interface for communication, and is treated as, for example, a hub and a LAN switch. Also, because the input/output device 30 does not communicate with the network device 10 by using an IP address of the network I/F connected to the network C 23 as a communication destination, the network device 10 does not necessarily have to have an IP address in the network I/F connected to the network C 23.

Each of the network A 21 and the network B 22 has an independent authentication server 50 (specifically, an authentication server 50a and an authentication server 50b). A subnet mask of the network A 21 is "192.168.1.0/24" and a subnet mask of the network B 22 is "192.168.2.0/24." An IP address of the authentication server 50a is "192.168.1.4" and an IP address of the authentication server 50b is "192.168.2.4."

The input/output device 30 has an IP address belonging to a subnet of the network A 21. An IP address of the input/output device 30 is "192.168.1.2." The network device 10 treats the input/output device 30 as a device connected to the network A 21. The input/output device 30 recognizes an IP address of the authentication server 50 as "192.168.1.4" or "192.168.2.4" in operations of a conventional system network configured in an organization. In the network system according to the present embodiment, the input/output device 30 recognizes the IP address "192.168.1.5" in the network A 21 of the network device 10 as the authentication server 50.

When communication is performed between the input/output device 30 connected to the network C 23 and each device connected to the network A 21, the network device 10 performs a bridge action in which a transmission process is performed without changing a Media Access Control (MAC) address or an IP address of a packet. When performing communication between the input/output device 30 connected to the network C 23 and each device connected to the network B 22, the network device 10 performs Source Network Address Translation (SNAT) or Destination Network Address Translation (DNAT) in which a MAC address or an IP address of a packet is converted and is transferred. Details of the transfer process of the packet in the network device 10 are described below.

The input/output device 30 is, for example, an image forming apparatus like a multifunctional machine that implements multiple functions in one machine, that is, a print function, a copy function, a scanner function and a facsimile function. The image forming apparatus may be referred to as a Multifunction Peripheral (MFP), a copier, and so forth other than a multifunctional machine. The input/output device 30 may have one of the print function, the copy function, the scanner function, and the facsimile function. In this case, the input/output device 30 is referred to as a printer, a copier, a scanner, or a facsimile machine, respectively.

The input/output device 30 is not limited to the image forming apparatus, but may be any desired apparatus such as an information processing apparatus. Other examples of the input/output device, or the information processing apparatus, include, for example, a projector (PJ), an intercommunicatable Interactive White Board (IWB: a white board having an electronic whiteboard function), an output device like a digital signage, a Head Up Display (HUD) device, a sound output device like a speaker, an industrial machine, an imaging device, a sound collecting device, a medical device, a network-connected home appliance, and so forth.

The authentication server 50a or the authentication server 50b (hereinafter, referred to as the authentication server 50 when it is not needed to distinguish them) is an authentication server device connected to the network A 21 or the network B 22, respectively. The authentication server 50 is a computer that performs user authentication of the input/output device 30. For example, the authentication server 50 authenticates a user using a Lightweight Directory Access Protocol (LDAP) server. The authentication method using the authentication server 50 is not limited to that described above.

The job server 70a or the job server 70b (hereinafter, referred to as the job server 70 when it is not needed to distinguish them) is a server device connected to the network A 21 or the network B 22, respectively. The job server 70 accumulates jobs with respect to the input/output device 30 as requested by the user PC 90. When user authentication of the input/output device 30 is performed, the job server 70 outputs the accumulated jobs to the input/output device 30.

The user PC 90a or the user PC 90b (hereinafter, referred to as the user PC 90 when it is not needed to distinguish them) is an information processor connected to the network A 21 or the network B 22, respectively. The user PC 90 is, for example, a communication terminal like a laptop personal computer (PC) that is portable and operatable by a user. The user PC 90 may be a portable telephone, a smartphone, a tablet terminal, a gaming machine, a personal digital assistant (PDA), a digital camera, a wearable PC, a desktop PC, and so forth.

In the above description, the network device 10 includes three network I/Fs. However, three or more network systems may exist and the network device 10 may include three or more network I/Fs.

First Embodiment

Outline

Figure 2:
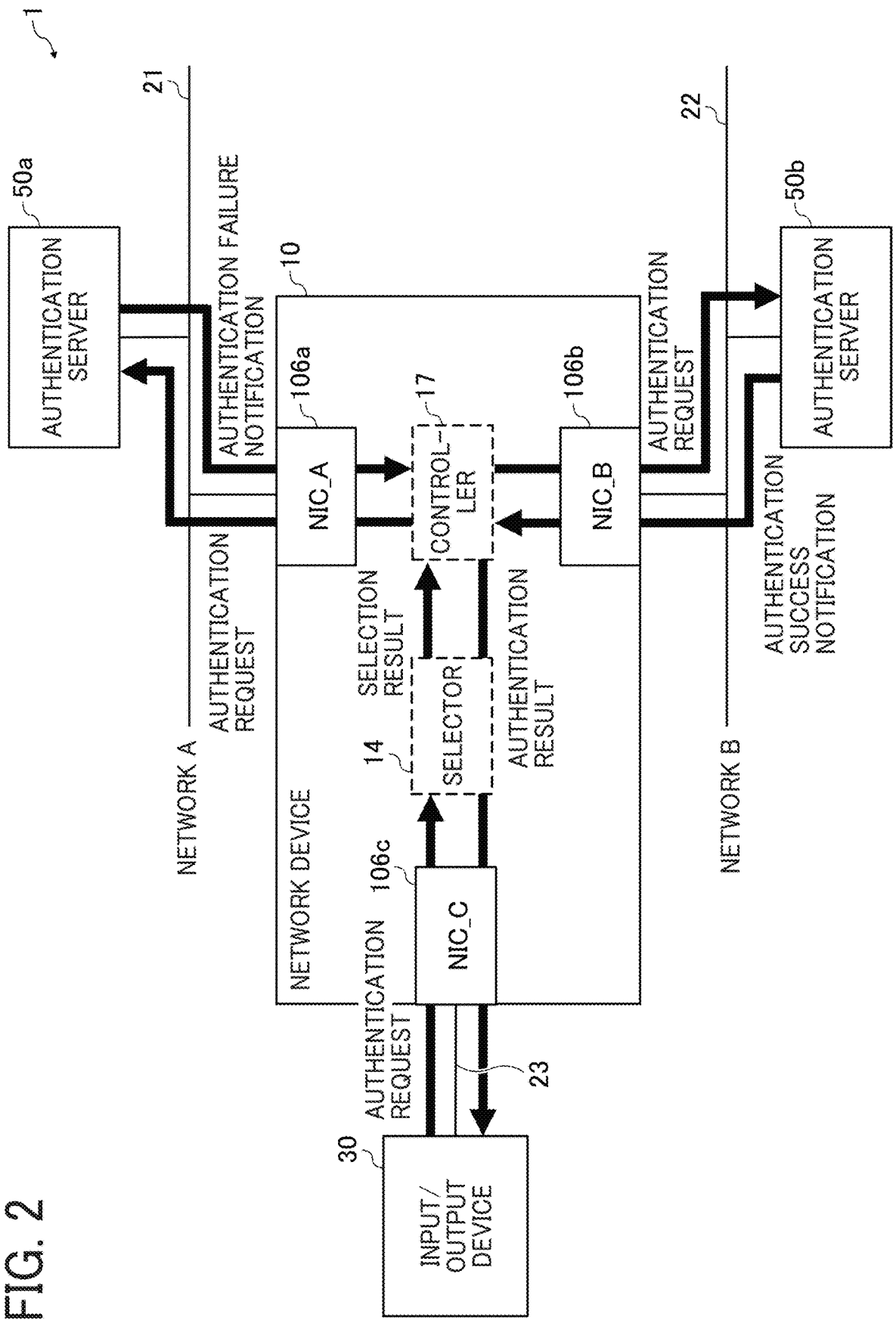
FIG. 2 is a diagram illustrating an example of an outline of a network system according to a first embodiment.

FIG. 2 is a diagram illustrating an example of an outline of the network system 1 according to a first embodiment. FIG. 2 illustrates an example in which the input/output device 30 performs an authentication process to the authentication server 50 via the network device 10 in the network system 1. FIG. 2 schematically illustrates an outline of the network system 1 according to the first embodiment, and details of functions and so forth to be implemented by the network system 1 and so forth are described below with reference to the drawings, and so forth.

The network device 10 illustrated in FIG. 2 includes three network I/Fs. A Network Interface Card (NIC)_A 106a is connected to the network A 21 to which the authentication server 50a is connected. A NIC_B 106b is connected to the network B 22 to which the authentication server 50b is connected. NIC_C 106c is connected to the network C 23 to which the input/output device 30 is connected. The NIC_C 106c is an example of a first network I/F. The NIC_A 106a is an example of a second network I/F. The NIC_B 106b is an example of a third network I/F. The network C 23 is an example of a first network. The Network A 21 is an example of a second network. The Network B 22 is an example of a third network. The authentication server 50a is an example of a first authentication device. The authentication server 50b is an example of a second authentication device.

In FIG. 2, the input/output device 30 transmits an authentication request by a user to the network device 10. The input/output device 30 transmits the authentication request to the network device 10 with the IP address of the network device 10 being a destination of the authentication server 50. The network device 10 receives the authentication request of the user by using the NIC_C 106. In response to receiving an authentication request from the input/output device 30, the network device 10 operates as an authentication proxy in an application layer (a layer 7) in the Open Systems Interconnection (OSI).

When the network device 10 receives an authentication request of a user, a selector 14 selects an authentication server 50 to which an authentication request is to be transmitted based on an authentication server list 41 (FIG. 6) stored in advance. The authentication server list 41 stores information indicating priorities for selecting each authentication server 50 connected to the network device 10. Information on priorities of the authentication server 50 is an example of condition information for selecting the network I/F used for transmitting the authentication request. The selector 14 selects an authentication server associated with the network I/F with the highest priority included in the authentication server list 41 as the authentication server 50 to which the authentication request is to be transmitted. Details of the authentication server list 41 are described later.

A controller 17 of the network device 10 controls to transmit an authentication request to the selected authentication server 50 by using the NIC_A 106a or the NIC_B 106b. In response to receiving an authentication result from the authentication server 50, the controller 17 controls transmission of the authentication result to the input/output device 30. When the authentication result transmitted from the authentication server 50 is an authentication success notification indicating that user authentication has succeeded, the controller 17 controls to transmit an authentication success notification to the input/output device 30.

On the contrary, when the authentication result transmitted from the authentication server 50 is an authentication failure notification indicating that user authentication has failed, the controller 17 controls to transmit an authentication request to an authentication server 50 other than the authentication server 50 having transmitted the authentication failure notification.

In the network system 1 illustrated in FIG. 2, the authentication server 50a transmits an authentication failure notification to the network device 10. The controller 17 of the network device 10 which receives the authentication failure notification by using the NIC_A 106a transmits an authentication request of the user to the authentication server 50b by using the NIC_B 106b.

The authentication server 50b transmits an authentication success notification to the network device 10. The controller 17 of the network device 10 which receives the authentication success notification by using the NIC_B 106b transmits an authentication success notification to the input/output device 30. Therefore, even when the authentication server 50 is managed in each communication network, the authentication request to the authentication server 50 may be performed via the network device 10 so that the network system 1 can perform user authentication of the input/output device 30 properly.

Conventionally, external authentication servers that use authentication protocols like Remote Authentication Dial In User Service (RADIUS) and LDAP establish an authentication policy called a realm or a domain in a protocol itself to identify an organization, and so forth, to which the user belongs. Also, there are authentication servers that perform authentication processes by original methods by using general-purpose protocols such as HTTP, and so forth without having an authentication policy called a realm or a domain. However, when an independent authentication server 50 is connected to each network, it is needed for the input/output device 30 to store settings and authentication systems of the authentication policies in the authentication servers 50 connected to all of the communication networks that the input/output device 30 shares.

Therefore, according to the first embodiment, the network system 1 performs user authentication of the input/output device 30 via the network device 10 that connects to the input/output device 30 and a plurality of authentication servers 50 by using different network I/Fs. In response to receiving an authentication request transmitted from the input/output device 30, the network device 10 selects an authentication server 50 to which the authentication request is transmitted based on the authentication server list 41. The network device 10 controls transmission of the authentication information to the input/output device 30 based on the information indicating the authentication result that is a reply to the authentication request to the selected authentication server 50. Therefore, even when an independent authentication server 50 is managed in each communication network, the network system 1 can properly perform user authentication in the input/output device 30.

Hardware Configuration

Figure 3:
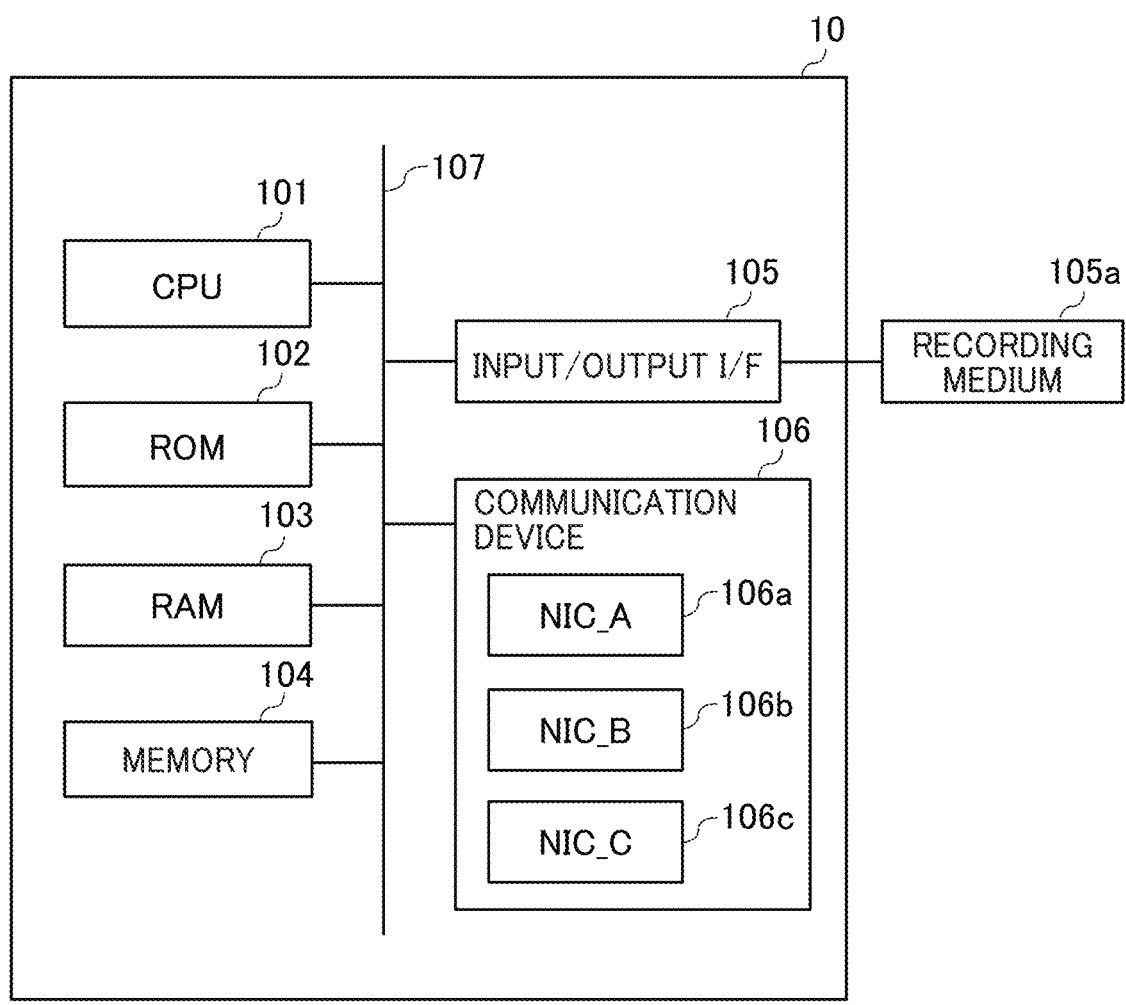
FIG. 3 is a diagram illustrating an example of a hardware configuration of a network device according to the first embodiment.

FIG. 3 is a diagram illustrating an example of a hardware configuration of the network device 10 according to the first embodiment. The hardware configuration of the network device 10 illustrated in FIG. 3 may be the same in each embodiment, or components may be added or removed as needed. The network device 10 includes a Central Processing Unit (CPU) 101, Read Only Memory (ROM) 102, Random Access Memory (RAM) 103, memory 104, an input/output I/F 105, a communication device 106, and a bus 107.

The CPU 101 is a computing device that reads programs and data according to the present embodiment stored in the ROM 102 and the memory 104 onto the RAM 103 and executes a process, thereby implementing each function of the network device 10. The network device 10 performs authentication by, for example, the CPU 101 executing a program according to the present embodiment.

The ROM 102 is nonvolatile memory that is capable of storing programs and data even after a switch is turned off. The ROM 102 is implemented by, for example, a flash ROM. A Software Development Kit (SDK) that supports multiple applications is installed in the ROM 102. Using the applications of the SDK, the function or a network connection of the network device 10 can be implemented. The RAM 103 is volatile memory used, for example, as a work area of the CPU 101.

The memory 104 is, for example, a storage device, such as a Hard Disk Drive (HDD) and a Solid State Drive (SSD). The memory 104 stores an Operation System (OS), an application program, and various types of data, for example. The input/output I/F 105 is an interface with which an external device is connected to the network device 10. The external device may be, for example, a recording medium 105a, such as a Universal Serial Bus (USB) memory stick, a memory card, and an optical disk, and various types of electronic equipment.

The communication device 106 performed communication (connection) with an external device via a network. The communication device 106 includes the NIC_A 106a, the NIC_B 106b, and the NIC_C 106c. The NIC_A 106a to the NIC_C 106c are interfaces that connect the network device 10 to the networks A to C. The NIC_A 106a to the NIC_C 106c are hardware, like a LAN card, with which the network device 10 is connected to a Local Area Network (LAN). For example, the NIC_A 106a to the NIC_C 106c are Ethernet (registered trademark) cards.

The NIC_A 106a to the NIC_C 106c may be removable from or may be incorporated in or fixed to the network device 10. Also, the NIC_A 106a to the NIC_C 106c may be externally attached to the network device 10. In this case, the network device 10 and the NIC_A 106a to the NIC_C 106c are connected by using a USB cable or an Institute of Electrical and Electronic Engineers (IEEE) 1394 cable, and so forth. The number of the NIC_A 106a to the NIC_C 106c is three here, but four or more NIC_A 106a to NIC_C 106c may be provided. The number of the NIC_A 106a to the NIC_C 106c is determined by the number of different networks by which the input/output device 30 is to be shared or by the capacity of the CPU 101.

The bus 107 is connected to each of the above components and transfers, for example, address signals, data signals and various control signals. The CPU 101, the ROM 102, the RAM 103, the memory 104, the input/output I/F 105, and the communication device 106 are connected to each other via the bus 107.

Figure 4:
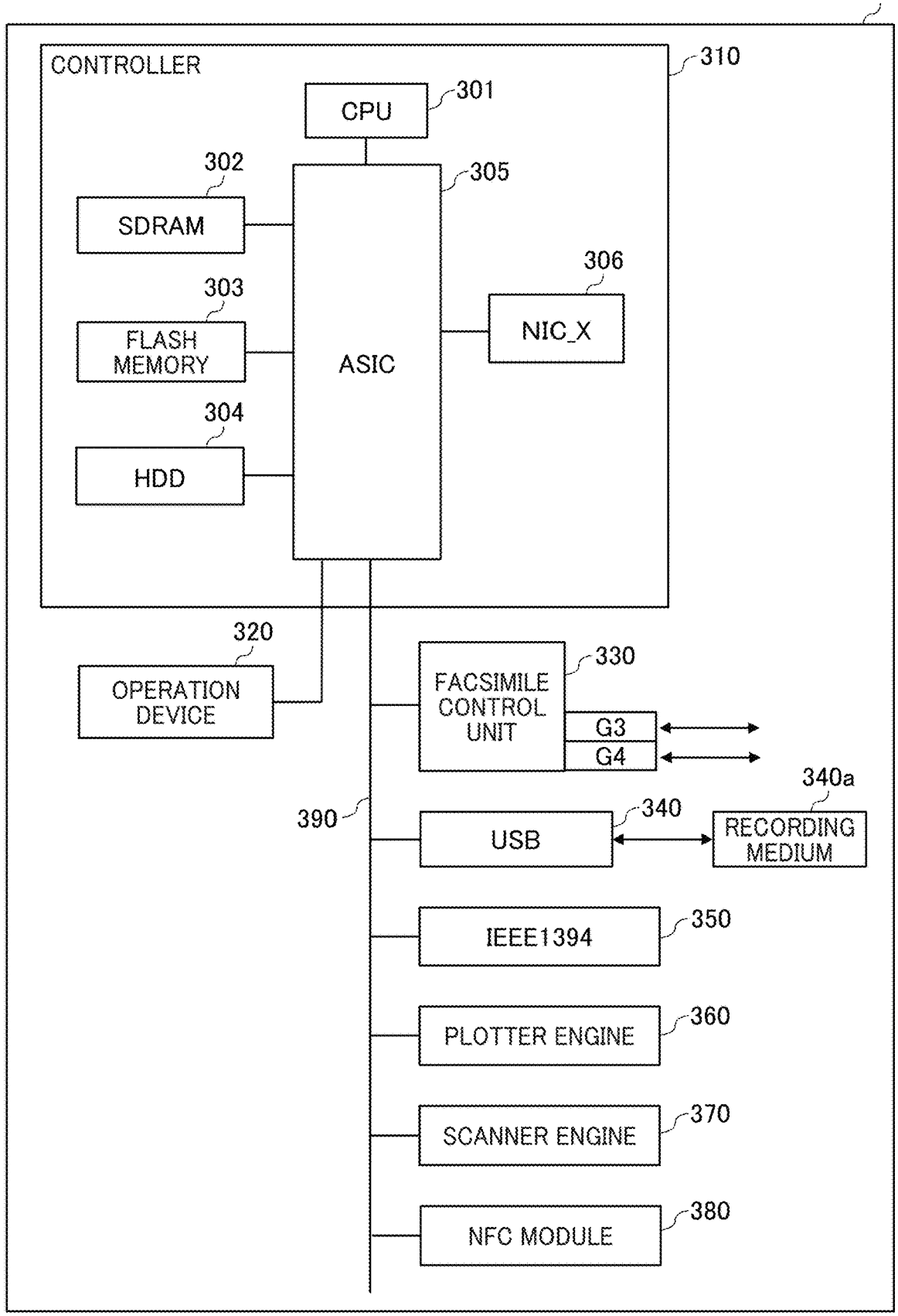
FIG. 4 is a diagram illustrating an example of a hardware configuration of an input/output device according to the first embodiment.

FIG. 4 is a diagram illustrating an example of a hardware configuration of the input/output device according to the first embodiment. FIG. 4 illustrates a hardware configuration of a multifunctional machine as an example of the input/output device 30. The hardware configuration of the input/output device 30 illustrated in FIG. 4 may be the same in each embodiment, or components may be added or removed as needed. The input/output device 30 includes a controller 310. The controller 310 includes a CPU 301, a Synchronous Dynamic Random Access Memory (SDRAM) 302, flash memory 303, an HDD) 304, an Application Specific Integrated Circuit (ASIC) 305, and the NIC_X 306.

The ASIC 305 is a multifunctional device board provided with a CPU I/F, an SDRAM I/F, a local bus I/F, a Peripheral Component Interconnect (PCI) bus I/F, a MAC I/F, an HDD I/F, and so forth.

The CPU 301 reads various programs from the HDD 304 via the ASIC 305 and executes the programs. The SDRAM 302 functions as, for example, program memory storing various programs, and work memory used when the CPU 301 executes various programs. Instead of the SDRAM 302, Dynamic Random Access Memory (DRAM) and Static Random Access Memory (SRAM) may be used.

The flash memory 303 is nonvolatile memory, and stores a boot loader (a boot program) that starts the input/output device 30 and an OS. Also, the flash memory 303 functions as application memory storing each program. The flash memory 303 functions as service memory storing software of each service (a copy service, a print service, and a facsimile service).

The flash memory 303 also functions as firm memory storing a firmware, and data memory storing network addresses or model numbers, and so forth. Instead of the flash memory 303, other nonvolatile memory like nonvolatile RAM in which RAM and back-up circuitry using a battery are integrated, or Electrically Erasable Programmable Read-Only Memory (EEPROM) and so forth may be used.

The HDD 304 is a nonvolatile storage medium that stores data regardless of on or off of power of the input/output device 30. The HDD 304 records programs stored in the flash memory 303, programs except data, and data. The HDD 304 may be used as firm memory.

The NIC_X 306 is an interface that communicates with other devices under an instruction of the CPU 301. The NIC_X 306 is the same as that of the network device 10. The input/output device 30 communicates with the network device 10 by using the NIC_X 306 via the network C 23.

An operation device 320 is connected to the controller 310 by using, for example, a USB cable. The operation device 320 is an interface for a user operating with respect to the input/output device 30. The operation device 320 includes various operation keys, a character display device implemented by a liquid crystal display (LCD) or a cathode-ray tube (CRT) and a touch panel as a display device. When operated via the operation device 320, the input/output device 30 can input data, execute jobs, and display.

Furthermore, a facsimile control unit 330, a USB 340 to which the recording medium 340a is detachably connected, an IEEE1394 (350), a plotter engine 360, a scanner engine 370, a Near Field Communication (NFC) module 380, and so forth are connected to the controller 310 via the PCI bus 390. Therefore, the input/output device 30 can provide services like a copy service, a print service, a facsimile service, and so forth. The plotter engine 360 may employ either of an electrophotography method or an inkjet printing system.

The illustrated configuration is a merely example and the hardware configuration of the input/output device 30 is not limited to the configuration illustrated in FIG. 4. For example, the NIC_X 306 may be connected to the PCI bus 390. The NIC_X 306 is connected to the network C by using a cable, but may also be connected wirelessly with a wireless LAN. A plurality of NIC_Xs 306 may be provided. Instead of or in addition to the NIC_X 306, the input/output device 30 may include a digital service unit (DSU) to be connected to a telephone network or a modem. The input/output device 30 may further include a communication device to be connected to a cellular telephone network.

Figure 5:
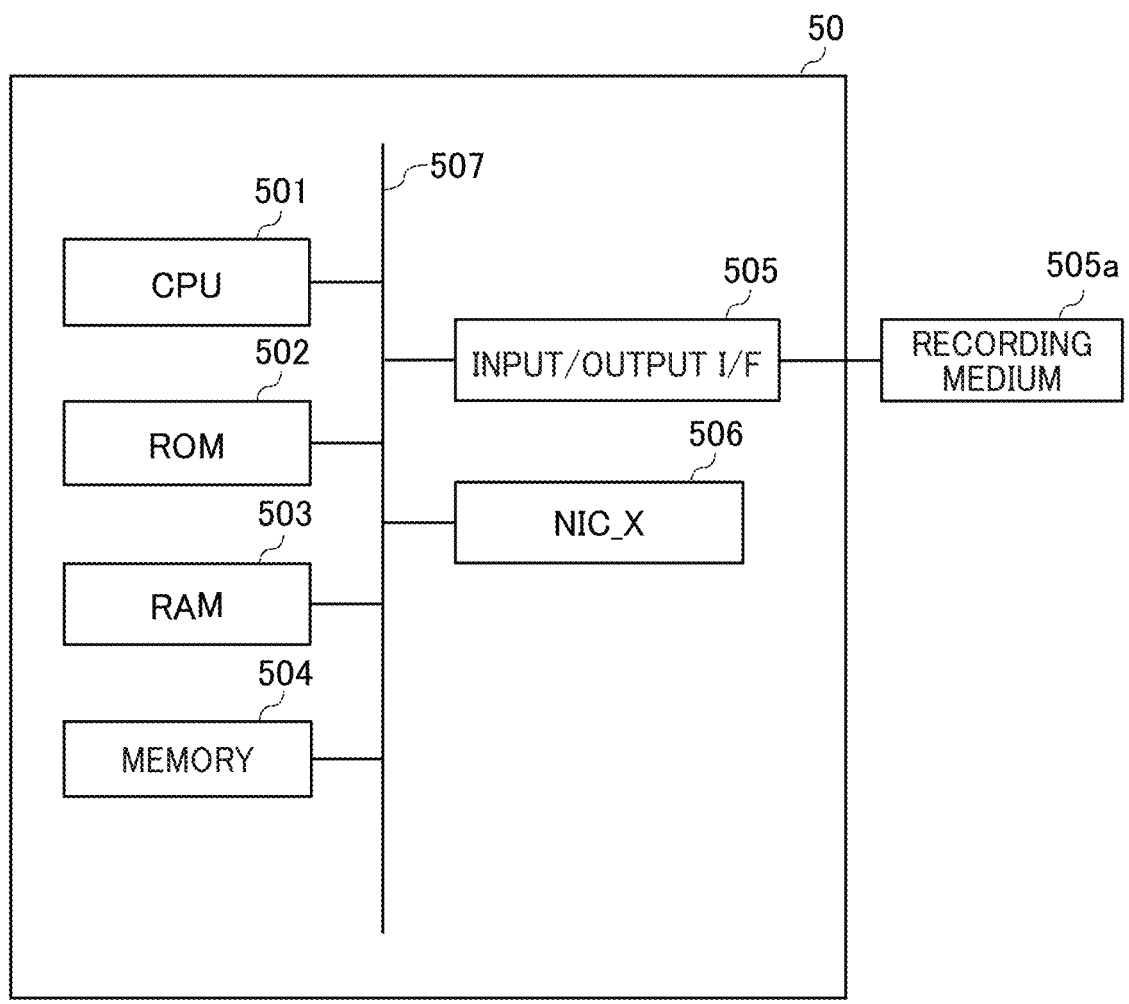
FIG. 5 is a diagram illustrating an example of a hardware configuration of an authentication server according to the first embodiment.

FIG. 5 is a diagram illustrating an example of a hardware configuration of the authentication server 50 according to the first embodiment. The hardware configuration of the authentication server 50 illustrated in FIG. 5 may be the same in each embodiment, or components may be added or removed as needed. The authentication server 50 includes a CPU 501, ROM 502, RAM 503, storage (memory) 504, an input/output I/F 505, a NIC_X 506, and a bus 507.

The CPU 501 controls the entire action of the authentication server 50. The CPU 501 is a computing device that reads programs and data stored in, for example, the ROM 502 and the memory 504 onto the RAM 503 and executes a process, thereby implementing each function of the authentication server 50.

The RAM 503 is a volatile memory used as, for example, a work area of the CPU 501. The ROM 502 is nonvolatile memory that can keep programs and data even after the power is turned off. The memory 504 is, for example, a memory like HDD, SSD or flash ROM, and stores an OS, application programs, various types of data, and so forth.

The input/output I/F 505 is an interface with which an external device is connected to the authentication server 50. The external device may be, for example, a recording medium 505*a* like a USB flash drive, a memory card, and an optical disk, or various electronic devices.

The NIC_X 506 is an interface that communicates with other devices under an instruction of the CPU 501. The NIC_X 506 is the same as that the network device 10 or the input/output device 30 includes. The authentication server 50*a* communicates with the network device 10 by using, for example, the NIC_X 506 via the network A 21. The authentication server 50*b* communicates with the network device 10 by using, for example, the NIC_X 506 via the network B 22.

The bus 507 connects each component and transfers address signals, data signals, various control signals, and so forth between the components. The CPU 501, the ROM 502, the RAM 503, the memory 504, the input/output I/F 505 and NIC_X 506 are connected one another via the bus 507.

Function Configuration

Figure 6:
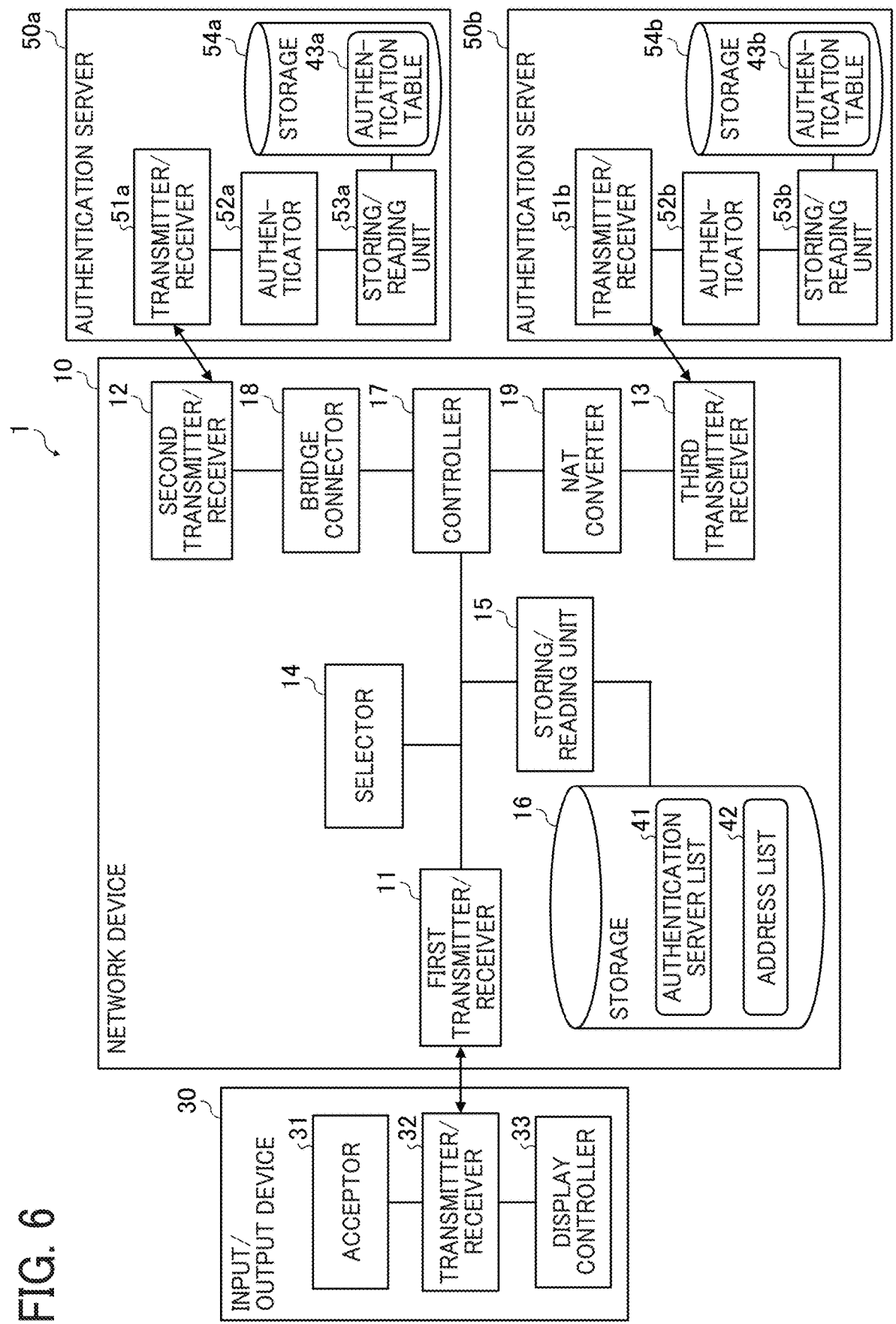
FIG. 6 is a diagram illustrating an example of a function configuration of the network system according to the first embodiment.

Next, a function configuration of the network system 1 according to the first embodiment is described. FIG. 6 is a diagram illustrating an example of a function configuration of the network system 1 according to the first embodiment. Functions implemented by the network device 10 include a first transmitter/receiver 11, a second transmitter/receiver 12, a third transmitter/receiver 13, the selector 14, the storing/reading unit 15, a storage 16, the controller 17, a bridge connector 18 and a Network Address Translation (NAT) converter 19.

The first transmitter/receiver 11 is a function to receive packets from the network C 23 and transmit packets to the network C 23. The first transmitter/receiver 11 receives an authentication request of a user transmitted from the input/output device 30. The authentication request of the user includes user information and authentication information like a password. The user information is, for example, a user name. The password is an example of confidential information used for the user authentication.

The first transmitter/receiver 11 transmits an authentication result transmitted from the authentication server 50 to the input/output device 30. The first transmitter/receiver 11 is implemented when, for example, the CPU 101 illustrated in FIG. 3 executes a program and controls the NIC_C 106*c*.

The second transmitter/receiver 12 is a function to receive packets from the network A 21 and transmit packets to the network A 21. The second transmitter/receiver 12 is implemented when, for example, the CPU 101 illustrated in FIG. 3 executes a program and controls the NIC_A 106*a*.

The third transmitter/receiver 13 is a function to receive packets from the network B 22 and transmit packets to the network B 22. The third transmitter/receiver 13 is implemented when, for example, the CPU 101 illustrated in FIG. 3 executes a program and controls the NIC_B 106*b*. Each of the second transmitter/receiver 12 and the third transmitter/receiver 13 transmits an authentication request of a user from the input/output device 30 to the authentication server 50 and receives a notification of the authentication result that is a reply to the authentication request from the authentication server 50. The second transmitter/receiver 12 and the third transmitter/receiver 13 are examples of communication means.

The selector 14 is a function to select the authentication server 50 to be a transmission destination of the authentication request based on the authentication server list 41 stored in the storage 16. The selector 14 is implemented by, for example, a program executed by the CPU 101 illustrated in FIG. 3.

Here, details of the authentication server list 41 are described. FIG. 7 is a diagram illustrating an example of the authentication server list 41 according to the first embodiment. The authentication server list 41 illustrated in FIG. 7 lists, for each of the authentication servers 50 connected to the network device 10, information regarding the authentication server 50. In the authentication server list 41, an IP address of the authentication server 50, a network I/F to be used for the communication with the authentication server 50, and priority of the authentication server 50 are associated with each other for each authentication server 50. Information on priority of the authentication server 50 is an example of condition information used for determining a network I/F for transmitting the authentication request.

The IP address of the authentication server 50 is destination information used when communicating with the authentication server 50 via a network. The IP address of the authentication server 50 is an example of information capable of locating the authentication server 50 in the network and, for example, such as a MAC address of the authentication server 50. The network I/F used for the communication with the authentication server 50 is, among network I/Fs provided in the network device 10, a network I/F available for the communication with the authentication server 50.

Regarding information on priority of the authentication server 50, priority is given to each authentication server 50 to which the network device 10 is connected. The greater the number of priority illustrated in FIG. 7 becomes, the higher the priority becomes. Priority can be set or changed by the user. The information on priority may be set so that the smaller the number of priority becomes, the higher the priority becomes. Further, priority may be expressed in terms of the degree of priority (high/low), the order of priority, or the number indicating large or small. Priority may be indicated by a plurality of types of information. Furthermore, priority is set so that, even when three or more authentication servers 50 to which the network device 10 is connected exist, priority of each authentication server 50 can be determined.

In the example of FIG. 7, the IP address of the authentication server 50*a* is "192.168.1.4" and can communicate by using the NIC_A 106*a*. The IP address of the authentication server 50*b* is "192.168.2.4" and can communicate by using the NIC_B 106*b*. Priority of the authentication server 50*a* is set to be higher than priority of the authentication server 50*b*.

Referring back to FIG. 6, description of the function configuration of the network device 10 is continued. The storing/reading unit 15 is a function to store various types of data in the storage 16 and read various types of data from the storage 16. The storing/reading unit 15 and the storage 16 are implemented by, for example, programs executed in the ROM 102, the memory 104, and the CPU 101 illustrated in FIG. 3. The storage 16 stores the authentication server list 41 illustrated in FIG. 6 and an address list 42 described later.

The controller 17 is a function to control communication with the input/output device 30 or the authentication server 50. The controller 17 controls to transmit the authentication request from the input/output device 30 to an authentication server 50 selected by the selector 14. Also, the controller 17 controls transmission of the authentication result to the input/output device 30 based on the authentication result that is a reply to the authentication request to the authentication server 50.

In particular, when the controller 17 receives an authentication success notification indicating that user authentication has succeeded from the authentication server 50, the controller 17 controls to transmit an authentication success notification to the input/output device 30. On the contrary, when the controller 17 receives an authentication failure notification indicating that the user authentication has failed from the authentication server 50, the controller 17 transmits an authentication request to an authentication server 50 other than the authentication server 50 that has transmitted the authentication failure notification. The controller 17 is implemented by, for example, a program executed by the CPU 101 illustrated in FIG. 3.

The bridge connector 18 is a relay function of a packet working in a data link layer (a layer 2) of the OSI. The bridge connector 18 stores a MAC address of a packet transmitted from the network C 23 in a MAC address table 42*a*, and a MAC address of a packet transmitted from the network A 21 in a MAC address table 42*a*. The bridge connector 18 is implemented by, for example, a program executed by the CPU 101 illustrated in FIG. 3.

Here, details of the MAC address table 42*a* are described. FIG. 8A illustrates an example of the MAC address table. The MAC address table illustrated in FIG. 8A stores the NIC_A 106*a* of the network A 21 and the NIC_C 106*c* of the network C 23 in association with each other. In the MAC address table illustrated in FIG. 8A, the authentication server 50*a* connected to the network A 21 and a MAC address of the authentication server 50*b* connected to the network C 23 are registered.

When a packet of which destination is a MAC address of a device in the network A 21 is transmitted from the network C 23, the bridge connector 18 refers to the MAC address table 42*a* and detects that the device of this MAC address exists in the network A 21. Then the bridge connector 18 transmits the packet to the network A 21 without change.

Similarly, when a packet of which destination is a MAC address of a device in the network C 23 is transmitted from the network A 21, the bridge connector 18 refers to the MAC address table 42*a* and detects that the device of this MAC address exists in the network C 23. Then the bridge connector 18 transmits the packet to the network C 23 without change.

In a one-on-one connection (in this case, a connection between the input/output device 30 and the authentication server 50*a*), the bridge connector 18 has a bridge function to control a transmission destination of data based on the MAC address. The bridge function is the same as those of a hub and an L2 switch that control a transmission destination of data based on a MAC address in a one-on-one connection or an n-on-n connection.

The NAT converter 19 is a function to interconvert IP addresses of packets working in an IP layer (a layer 3) of the OSI. The NAT converter 19 interconverts IP addresses with reference to the NAT table 42*b*.

Here, details of the NAT table 42*b* are described. FIG. 8B illustrates an example of the NAT table. In the NAT table 42*b*, an IP address before conversion and an IP address after conversion are correlated with each other. The IP address before conversion is an IP address of the network device 10 (because a destination of the authentication server 50*b* is the network device 10), and an IP address after conversion is an IP address of the input/output device 30.

When a packet of which destination is an IP address of the network device 10 is transmitted from the authentication server 50*b* of the network B 22 (an IP address of a transmission source is the authentication server 50*b*), the NAT converter 19 refers to the NAT table 42*b* and converts the IP address of the destination of this packet into an IP address of the input/output device 30. When a packet of which destination is the IP address of the authentication server 50*b* is transmitted from the input/output device 30 as a reply of this packet, the NAT converter 19 refers to the NAT table 42*b* and converts the IP address of the transmission source into the IP address of the network device 10 from the IP address of the input/output device 30 and transmits the packet to the network B 22.

Next, referring back to FIG. 6, a function configuration of the input/output device 30 is described. Functions implemented by the input/output device 30 include an acceptor 31, a transmitter/receiver 32, and a display controller 33. The acceptor 31 is a function to accept an authentication request of a user from the user of the input/output device 30. For example, the acceptor 31 accepts an authentication request from a user by reading an IC card or receiving input to the operation device 320 via a keyboard, a touch panel, and so forth. The acceptor 31 is implemented by, for example, a program executed by the operation device 320 and the CPU 301 illustrated in FIG. 4.

The transmitter/receiver 32 functions to receive packets from the network C 23 and transmit packets to the network C 23. The transmitter/receiver 32 transmits an authentication request of a user to the network device 10. The transmitter/receiver 32 receives an authentication result with respect to the authentication request from the network device 10. The transmitter/receiver 32 is implemented by a program executed by, for example, the NIC_X 306 and the CPU 301 illustrated in FIG. 4.

The display controller 33 is a function to cause the operation device 320 display the authentication result transmitted from the network device 10. The display controller 33 is implemented by a program executed by, for example, the operation device 320 and the CPU 301 illustrated in FIG. 4.

Next, a function configuration of the authentication server 50 is described. Since the authentication server 50a connected to the network A 21 and the authentication server 50b connected to the network B 22 are the same in function, repeated description is omitted.

The function implemented by the authentication server 50a includes a transmitter/receiver 51a, an authenticator 52a, a storing/reading unit 53a, and a storage 54a. The transmitter/receiver 51a is a function to receive packets from the network A 21 and transmit packets to the network A 21. The transmitter/receiver 51a receives an authentication request of a user of the input/output device 30 from the network device 10. The transmitter/receiver 51a transmits the authentication result that is a reply to the received authentication request to the network device 10. The transmitter/receiver 51a is implemented by a program executed by, for example, the NIC_X 506 and the CPU 501 illustrated in FIG. 5.

The authenticator 52a is a function to perform user authentication based on authentication information included in the authentication request received by the transmitter/receiver 51a. In particular, when authentication information included in the received authentication request is included in an authentication table 43a stored in the storage 54a, the transmitter/receiver 51a outputs an authentication success notification indicating that the user authentication has succeeded. On the contrary, when the authentication information included in the received authentication request is not included in the authentication table 43a stored in the storage 54a, the transmitter/receiver 51a outputs an authentication failure notification indicating that the user authentication has failed. The authenticator 52a is implemented by, for example, a program executed by the CPU 501 illustrated in FIG. 5.

Details of an authentication table 43 are described. FIGS. 9A and 9B are diagrams illustrating an example of the authentication table according to the first embodiment. The authentication table 43 illustrated in FIGS. 9A and 9B illustrates authentication information of a user for whom the authentication process is performed in the authentication server 50. As illustrated in FIGS. 9A and 9B, the authentication information includes a user name and a password. For example, the user name is an example of user information. The password is an example of confidential information used for the user authentication. The authentication information can be set or changed by a user or a manager.

FIG. 9A illustrates the authentication table 43a stored in the storage 54a of the authentication server 50a. As illustrated in FIG. 9A, the authentication server 50a performs an authentication process of a user having authentication information of a user name "taro" and a password "abcd," and a user having authentication information of a user name "jiro" and a password "cdef."

FIG. 9B illustrates an authentication table 43b stored in the storage 54b of the authentication server 50b. As illustrated in FIG. 9B, the authentication server 50b performs an authentication process of a user having authentication information of a user name "hanako" and a password "bcde," and a user having authentication information of a user name "kaori" and a password "defg."

Referring back to FIG. 6, description of the function configuration of the authentication server 50 is continued. The storing/reading unit 53a is a function to store various types of data in the storage 54a and read various types of data from the storage 54a. The storing/reading unit 53a and the storage 54a are implemented by, for example, programs executed by the ROM 502, the memory 504, and the CPU 501 illustrated in FIG. 5. The storage 54a stores the authentication table 43a illustrated in FIGS. 9A and 9B.

Authentication Process

Next, an authentication process in the network system 1 according to the first embodiment is described. FIG. 10 is a sequence diagram illustrating an example of the authentication process performed by the network system 1 according to the first embodiment. FIG. 10 illustrates a case in which an authentication process of a user whose user name is "hanako" illustrated in FIGS. 9A and 9B is performed.

In step S101, the input/output device 30 accepts an authentication request from a user. In particular, the acceptor 31 of the input/output device 30 accepts an authentication request from a user whose user name is "hanako" by, for example, a user operation to the operation device 320. The acceptor 31 outputs the accepted authentication request to the transmitter/receiver 32.

In step S102, the input/output device 30 transmits the authentication request of the user to the first transmitter/receiver 11 of the network device 10. In particular, when the transmitter/receiver 32 of the input/output device 30 detects the authentication request from the user whose user name is "hanako" output from the acceptor 31, the transmitter/receiver 32 transmits the detected authentication request to the first transmitter/receiver 11. Since the input/output device 30 recognizes the network device 10 as an authentication server, the input/output device 30 transmits an authentication request to the IP address "192.168.1.5" of the network device 10.

In step S103, the first transmitter/receiver 11 of the network device 10 outputs the received authentication request to the selector 14. In response to receiving the authentication request from the input/output device 30, the network device 10 operates as an authentication proxy in the application layer (the layer 7) of the OSI.

In response to receiving the authentication request in step S104, the selector 14 of the network device 10 reads out an authentication server list 41 stored in the storage 16. In particular, the selector 14 outputs a readout request of the authentication server list 41 to the storing/reading unit 15. In response to detecting the output readout request, the storing/reading unit 15 reads out the authentication server list 41 stored in the storage 16.

In step S105, the storage 16 of the network device 10 outputs the authentication server list 41 to the selector 14. In particular, the storage 16 outputs the authentication server list 41 to the storing/reading unit 15. The storing/reading unit 15 outputs the authentication server list 41 to the selector 14.

In step S106, the selector 14 of the network device 10 selects an authentication server 50 to which an authentication request is transmitted based on condition information corresponding to the authentication server 50 included in the authentication server list 41. In particular, the selector 14 selects an authentication server 50 with highest priority as authentication server 50 to which the authentication request is transmitted from among the authentication servers 50 included in the authentication server list 41. Information on priority of the authentication server 50 is an example of condition information used for selecting a network I/F for transmitting the authentication request. Because the authentication server 50a is the authentication server 50 with the highest priority in the authentication server list 41 illustrated in FIG. 7, the selector 14 selects the authentication server 50a as the authentication server 50 to which the authentication request is transmitted.

In step S107, the selector 14 of the network device 10 outputs, to the controller 17, information on the authentication server 50 that is the selection result. In particular, the selector 14 outputs, to the controller 17, information on the authentication server 50a that is the selection result.

In step S108, the controller 17 of the network device 10 outputs, to the second transmitter/receiver 12, a transmission instruction of the authentication request with respect to the authentication server 50a. In step S109, the second transmitter/receiver 12 of the network device 10 transmits the authentication request of the user to the authentication server 50a.

Figure 11:
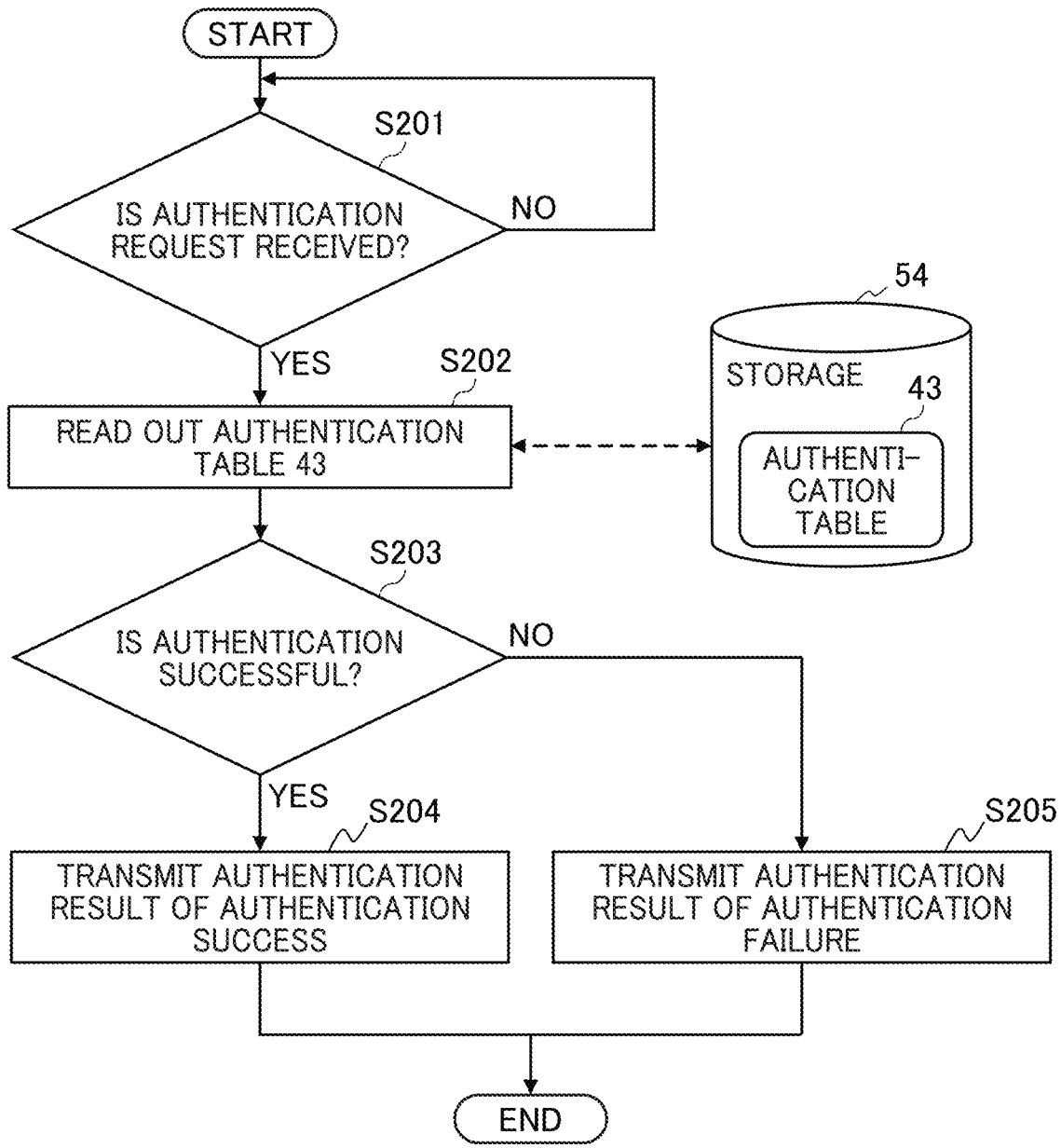
FIG. 11 is a flowchart illustrating an example of a user authentication process, performed by the authentication server, according to the first embodiment.

Here, a user authentication process in the authentication server 50 according to the first embodiment is described. FIG. 11 is a flowchart illustrating an example of the user authentication process, performed by an authentication server, according to the first embodiment. In step S201, when the transmitter/receiver 51 of the authentication server 50 receives an authentication request from the network device 10, the transmitter/receiver 51 proceeds the process to step S202. In this case, the transmitter/receiver 51 outputs the received authentication request to the authenticator 52. The authentication server 50 repeats the process of step S201 until the authentication request is received from the network device 10. In step S202, when the authenticator 52 of the authentication server 50 detects the output authentication request, the authenticator 52 reads out the authentication table 43 stored in the memory 54.

In step S203, the authenticator 52 of the authentication server 50 performs the user authentication process based on the read authentication table 43 and the authentication information included in the authentication request. In response to succeeding in user authentication, the authenticator 52 proceeds the process to step S204. In step S204, the transmitter/receiver 51 of the authentication server 50 transmits an authentication success notification to the network device 10. In particular, when the authentication information (user information and a password) included in the authentication request is included in the read authentication table 43, the authenticator 52 recognizes that the user authentication has succeeded and outputs an authentication success notification to the transmitter/receiver 51. The transmitter/receiver 51 then transmits the output authentication success notification to the network device 10.

In step S203, when the authenticator 52 of the authentication server 50 fails user authentication, the authenticator 52 proceeds the process to step S205. In step S205, the transmitter/receiver 51 of the authentication server 50 transmits an authentication failure notification to the network device 10. In particular, when the authentication information (user information and a password) included in the authentication request is not included in the read authentication table 43, the authenticator 52 recognizes that the user authentication has failed and outputs an authentication failure notification to the transmitter/receiver 51. The transmitter/receiver 51 transmits the output authentication failure notification to the network device 10.

Referring back to FIG. 10, description of the authentication process in the network system according to the first embodiment is continued. In step S110, because no authentication information of the user whose user name is "hanako" is included in the authentication table 43a, the authentication server 50a transmits an authentication failure notification to the second transmitter/receiver 12 of the network device 10. As the authentication process in the authentication server 50a, the process illustrated in FIG. 10 is performed.

In step S111, the second transmitter/receiver 12 of the network device 10 outputs the received authentication failure notification to the controller 17. In step S112, the controller 17 of the network device 10 reads out the information of the authentication server 50 with respect to the selector 14. In particular, the controller 17 reads out information with respect to the selector 14 to acquire information of the authentication server 50 with the next highest priority to the authentication server 50a.

In step S113, when the selector 14 of the network device 10 detects the readout of the information of the authentication server 50 from the controller 17, the selector 14 selects an authentication server 50. In particular, the selector 14 selects an authentication server 50 with the second highest priority in the authentication server list 41. Because the authentication server 50 with the second highest priority is the authentication server 50b in the authentication server list 41 illustrated in FIG. 7, the selector 14 selects the authentication server 50b.

In step S114, the selector 14 of the network device 10 outputs, to the controller 17, information of the authentication server 50 that is the selection result. In particular, the selector 14 outputs, to the controller 17, information of the authentication server 50b that is the selection result. In step S115, the controller 17 of the network device 10 outputs, to the third transmitter/receiver 13, a transmission instruction of the authentication request with respect to the authentication server 50b. In step S116, the third transmitter/receiver 13 of the network device 10 transmits an authentication request of the user to the authentication server 50b. The authentication request transmitted to the authentication server 50b is similar to the authentication request with respect to the authentication server 50a described in step S109.

In step S117, because authentication information of a user whose user name is "hanako" is included in the authentication table 43b in the authentication server 50b, the authentication server 50b transmits an authentication success notification to the third transmitter/receiver 13 of the network device 10. As the authentication process in the authentication server 50b, the process illustrated in FIG. 10 is performed. In step S118, the third transmitter/receiver 13 of the network device 10 outputs, to the controller 17, the authentication success notification received from the authentication server 50b. In step S119, the controller 17 of the network device 10 outputs the authentication success notification to the first transmitter/receiver 11.

In step S120, the first transmitter/receiver 11 of the network device 10 transmits an authentication success notification to the input/output device 30. In response to receiving the authentication success notification, the input/output device 30 causes the operation device 320 to display a notification indicating the authentication success with characters and images. Then, the authentication process of the user whose user name is "hanako" of the input/output device 30 is completed. The input/output device 30 authenticated by the authentication server 50b now can exchange data with the job server 70b or the user PC 90b illustrated in FIG. 1.

Figure 12:
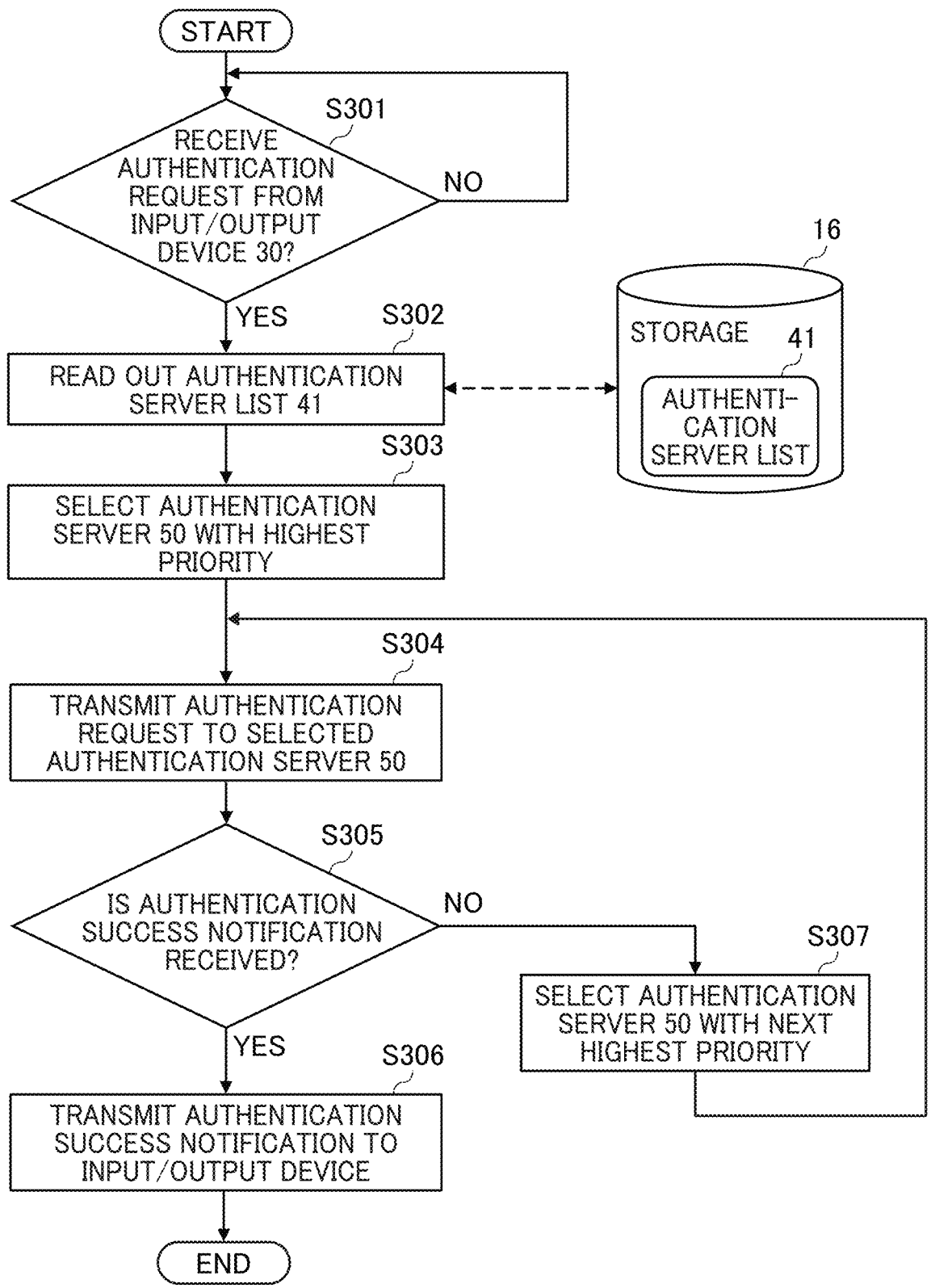
FIG. 12 is a flowchart illustrating an example of a selection process, performed by the network device, according to the first embodiment.

FIG. 12 is a flowchart illustrating an example of a selection process, performed by the network device, according to the first embodiment. In step S301, when the network device 10 receives an authentication request from the input/output device 30, the network device 10 proceeds the process to step S302. The network device 10 repeats the process of step S301 until the network device 10 receives an authentication request from the input/output device 30. In step S302, when the network device 10 receives an authentication request, the network device 10 reads out the authentication server list 41 stored in the storage 16.

In step S303, the network device 10 selects an authentication server 50 associated with the network I/F used for transmitting the authentication request, which is selected based on the condition information of the authentication server 50 included in the read authentication server list 41 (an example of the selection step). In particular, the network device 10 selects an authentication server 50 with the highest priority included in the authentication server list 41. In step S304, the network device 10 transmits an authentication request to the selected authentication server 50.

In step S305, when the network device 10 receives an authentication success notification from the authentication server 50 which has transmitted the authentication request, the network device 10 proceeds the process to step S306. In step S306, the network device 10 transmits an authentication success notification to the input/output device 30. On the contrary, in step S305, when the network device 10 receives an authentication failure notification from the authentication server 50 which has transmitted the authentication request, the network device 10 proceeds the process to step S307. In step S307, the network device 10 selects an authentication server 50 with the second highest priority included in the authentication server list 41 and repeats the processes from step S304. The processes of steps S304 to S307 are examples of the control steps.

As discussed above, the network system according to the first embodiment performs user authentication of the input/output device 30 via the network device 10 connected to a plurality of authentication servers 50 using a plurality of network I/Fs connected to different communication networks. In response to receiving an authentication request transmitted from the input/output device 30, the network device 10 selects, based on the condition information of the authentication server 50 included in the authentication server list 41, an authentication server 50 associated with the network I/F used for transmitting the authentication request. The network device 10 then controls transmission of the authentication information to the input/output device 30 based on the authentication result that is the reply to the authentication request to the selected authentication server 50. Therefore, the network system according to the first embodiment can properly perform user authentication in the input/output device 30 even when a plurality of authentication servers 50 is provided in the different communication networks to which the input/output device 30 is connected.

Modification of First Embodiment

Next, a configuration of a network system according to a modification of the first embodiment is described. A network device 10 according to a modification of the first embodiment selects an authentication server 50 to be a transmission destination of an authentication request based on information on confidentiality of a network to which the authentication server 50 is connected. The confidentiality of the network indicates the level of security, which may differ between the plurality of different networks. Since the network system of this example can select an authentication server 50 depending on the type (confidentiality) of information to be processed by the input/output device 30, user authentication in the input/output device 30 can be properly performed using the authentication server 50 that has the confidentiality corresponding to the type of information.

Here, an authentication server list 41a stored in storage 16 of the network device 10 is described. FIG. 13 is a diagram illustrating an example of an authentication server list according to the modification of the first embodiment. The authentication server list 41a illustrated in FIG. 13 includes, instead of priority information illustrated in FIG. 7, information on confidentiality of the network. Information on confidentiality of the network is provided for each authentication server 50. Information on confidentiality of the network is an example of condition information with which the network I/F used for transmitting the authentication request is associated. In the authentication server list 41a, for example, an authentication server 50 (a network I/F) connected to a network in which information to be kept private, like personal information, flows has high confidentiality. On the contrary, in the authentication server list 41a, an authentication server 50 (a network I/F) connected to a network in which information of which confidentiality is not higher than that of the personal information flows has low confidentiality.

In the example of FIG. 13, an IP address of the authentication server 50a is "192.168.1.4" and communication can be performed by using the NIC_A 106a. An IP address of the authentication server 50b is "192.168.2.4" and communication can be performed by using the NIC_B 106b. Confidentiality of the authentication server 50a is set higher than that of the authentication server 50b.

The selector 14 of the network device 10 selects an authentication server 50 that is a transmission destination of the authentication request based on, for example, attribute information of the input/output device 30 that has transmitted the authentication request and information on confidentiality included in the authentication server list 41a. The attribute information of the input/output device 30 is information about the type of the information to be processed by the input/output device 30. The attribute information of the input/output device 30 includes, for example, information indicating the degree of confidentiality of the information to be processed by the input/output device 30. When confidentiality of the input/output device 30 is high, the selector 14 of the network device 10 selects an authentication server 50 with high confidentiality included in the authentication server list 41a.

The attribute information of the input/output device 30 is included in the authentication request transmitted from the input/output device 30. The selector 14 of the network device selects an authentication server 50 to be a transmission destination of the authentication request based on the attribute information of the input/output device 30 included in the received authentication request and the information on confidentiality included in the authentication server list 41a. The attribute information of the input/output device 30 may be notified to the network device 10 in a form other than the authentication request transmitted from the input/output device 30.

As described above, the network device 10 according to this example selects an authentication server 50 to be a transmission destination of the authentication request based on the information on confidentiality of the network included in the authentication server list 41a. Since the network system can select an authentication server 50 depending on confidentiality of information to be processed by the input/output device 30, user authentication of the user operating the input/output device 30 can be properly performed using the authentication server 50 that corresponds to the type of information.

Similarly to the authentication server list 41, the authentication server list 41a may additionally include information on priority of the authentication server 50. In this case, the selector 14 of the network device 10 selects an authentication server 50 with the highest priority from among the authentication servers 50 of the same level of confidentiality, if there is more than one authentication server 50 listed for the same level of confidentiality.

Second Embodiment

Next, a configuration of a network system according to a second embodiment is described. The network system according to the second embodiment confirms, before transmitting an authentication request to an authentication server 50 in an authentication protocol, whether user information of a user who transmits an authentication request is stored in an authentication table 43 of an authentication server 50.

In the network system, when the authentication server 50 is connected to each network, transmitting authentication information that is managed by a certain authentication server 50 to other authentication server 50 may cause information leakage and thus is unfavorable in a security aspect. Therefore, in the network system according to the second embodiment, before transmitting an authentication request including authentication information to the authentication server 50, presence of a user (that is, whether the user has registered to the network) is confirmed with respect to the authentication server 50 by using user information included in the authentication information.

That is, in the process of confirming registration of a user to the network, confidential information like passwords included in the authentication information is not transmitted to the authentication server 50. Therefore, by avoiding transmission of authentication information to an authentication server 50 that does not manage authentication information of a user who makes an authentication request, security can be strengthen.

Function Configuration

Figure 14:
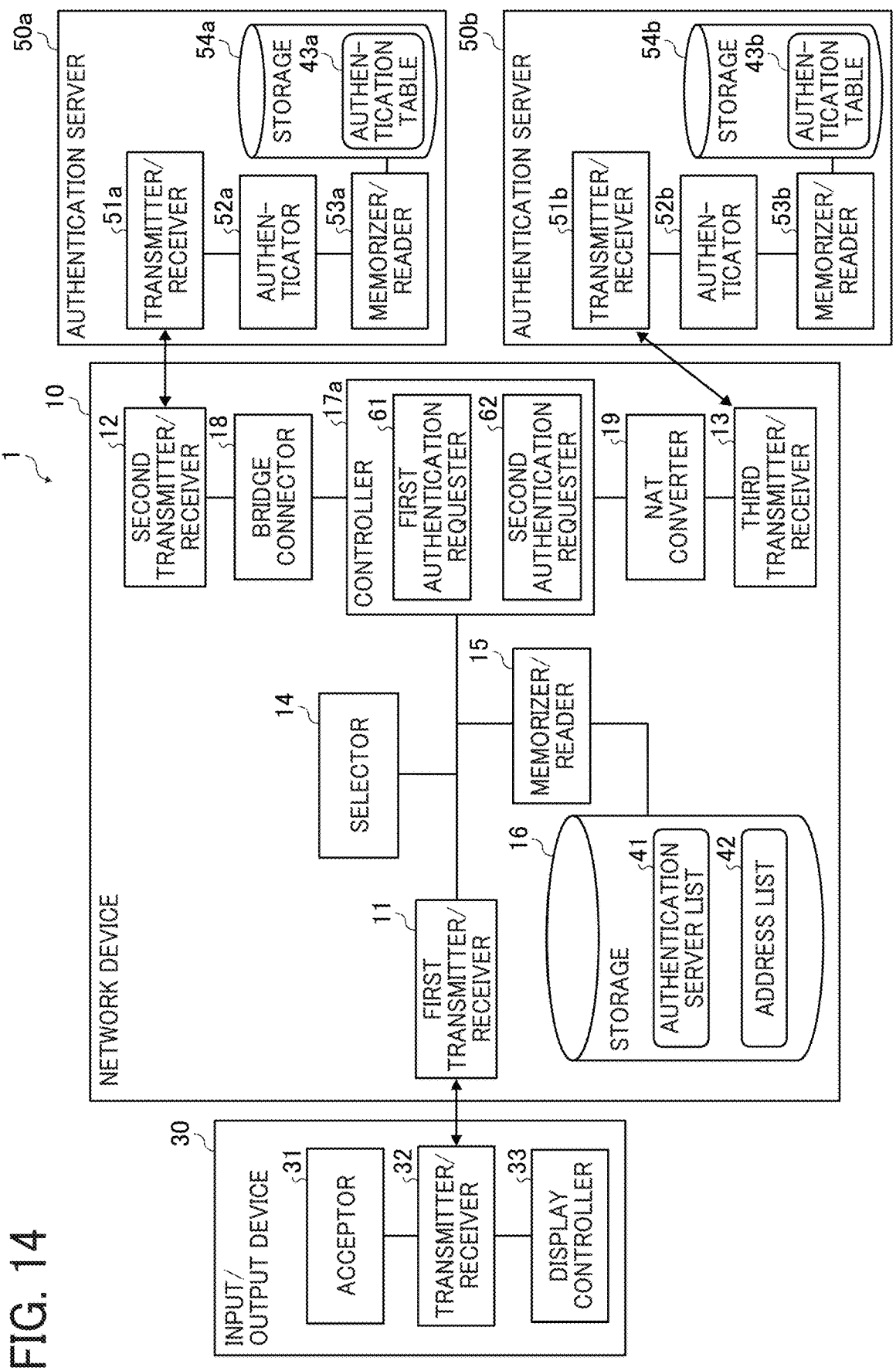
FIG. 14 is a diagram illustrating an example of a function configuration of a network system according to a second embodiment.

FIG. 14 is a diagram illustrating an example of a function configuration of a network system according to the second embodiment. The same functions as those of the first embodiment are denoted by the same reference numerals and description thereof is omitted. The network device 10 illustrated in FIG. 14 has a function of a controller 17a in addition to the function of that of the first embodiment. The controller 17a includes a function of a first authentication requester 61 and a function of a second authentication requester 62.

The first authentication requester 61 controls to transmit, to an authentication server 50 selected by the selector 14, user information included in the authentication request transmitted from the input/output device 30. The user information is, for example, a user name that is a part of the authentication information.

Before transmitting the authentication request to the authentication server 50, the first authentication requester 61 controls to transmit user information as a user identification request to the authentication server 50. The user identification request is a request for confirming that user information of a user who transmits an authentication request is included in the authentication table 43 of the authentication server 50.

When the user information transmitted from the network device 10 is included in the authentication table 43 managed by the authentication server 50, the authentication server 50 transmits a presence notification of the user to the network device 10. When no user information transmitted from the network device 10 is included in the authentication table 43 managed by the authentication server 50, the authentication server 50 transmits a non-presence notification of the user to the network device 10. The presence notification indicates that the user has been registered to the network, and the non-presence notification indicates that the user has not been registered to the network.

In response to receiving the non-presence notification of the user, the first authentication requester 61 controls to transmit user information included in the authentication request transmitted from the input/output device 30 to an authentication server 50 other than the authentication server 50 that has transmitted the non-presence notification. The first authentication requester 61 is implemented by, for example, a program executed by the CPU 101 illustrated in FIG. 3.

In response to receiving a presence notification of a user from an authentication server 50 to which user information has been transmitted by the first authentication requester 61, the second authentication requester 62 controls to transmit an authentication request of the user to the authentication server 50 to which the presence notification of the user has been transmitted. The second authentication requester 62 is implemented by, for example, a program executed by the CPU 101 illustrated in FIG. 3.

Authentication Process

Figure 15B:
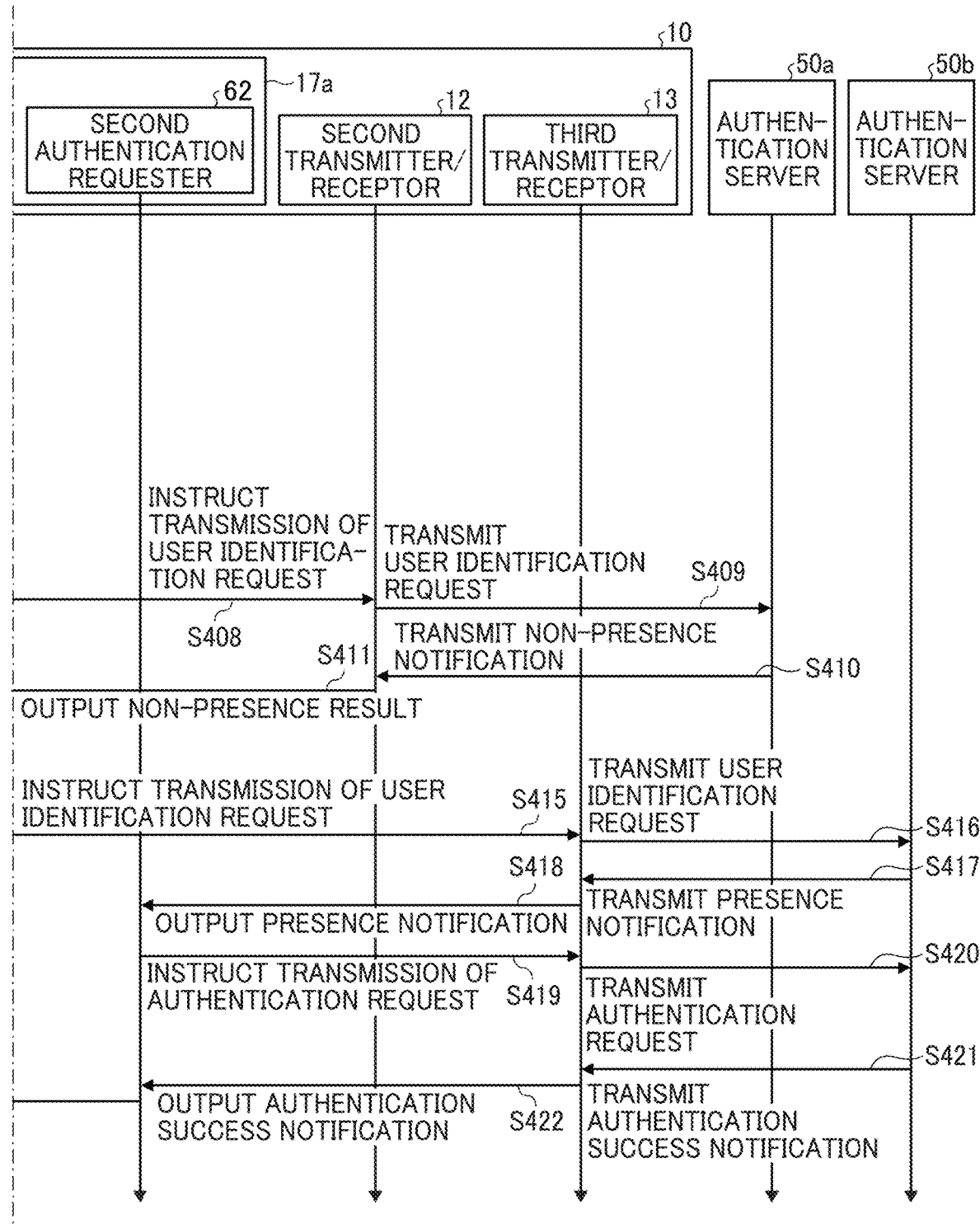

Next, an authentication process in the network system according to the second embodiment is described. FIGS. 15A and 151B (FIG. 15) are a sequence diagram illustrating an example of the authentication process, performed by the network system, according to the second embodiment. In FIG. 15, as in the process illustrated in FIG. 10, a case in which an authentication process of a user whose user name is "hanako" as illustrated in FIG. 9B is described. Because the processes of steps S401 to S407 illustrated in FIG. 15 are the same as the processes of steps S101 to S107 illustrated in FIG. 10, description thereof is omitted.

In step S408, in response to detecting the output selection result, the first authentication requester 61 of the network device 10 outputs a transmission instruction of the user identification request to the second transmitter/receiver 12. It is assumed that the selection result indicates the selection of the authentication server 50a, as detected in step S107 illustrated in FIG. 10. In particular, the first authentication requester 61 outputs a transmission instruction of the user identification request to the second transmitter/receiver 12 to transmit the user identification request to the authentication server 50a that is the selection result. The user identification request is a request for confirming that user information of the user, who has requested to transmit the authentication request, is included in the authentication table 43 of the authentication server 50. The user information is, for example, a user name that is a part of the authentication information.

In step S409, the second transmitter/receiver 12 of the network device 10 transmits the user identification request to the authentication server 50a. In particular, the second transmitter/receiver 12 transmits, to the authentication server 50a, user information included in the authentication request from the input/output device 30.

Figure 16:
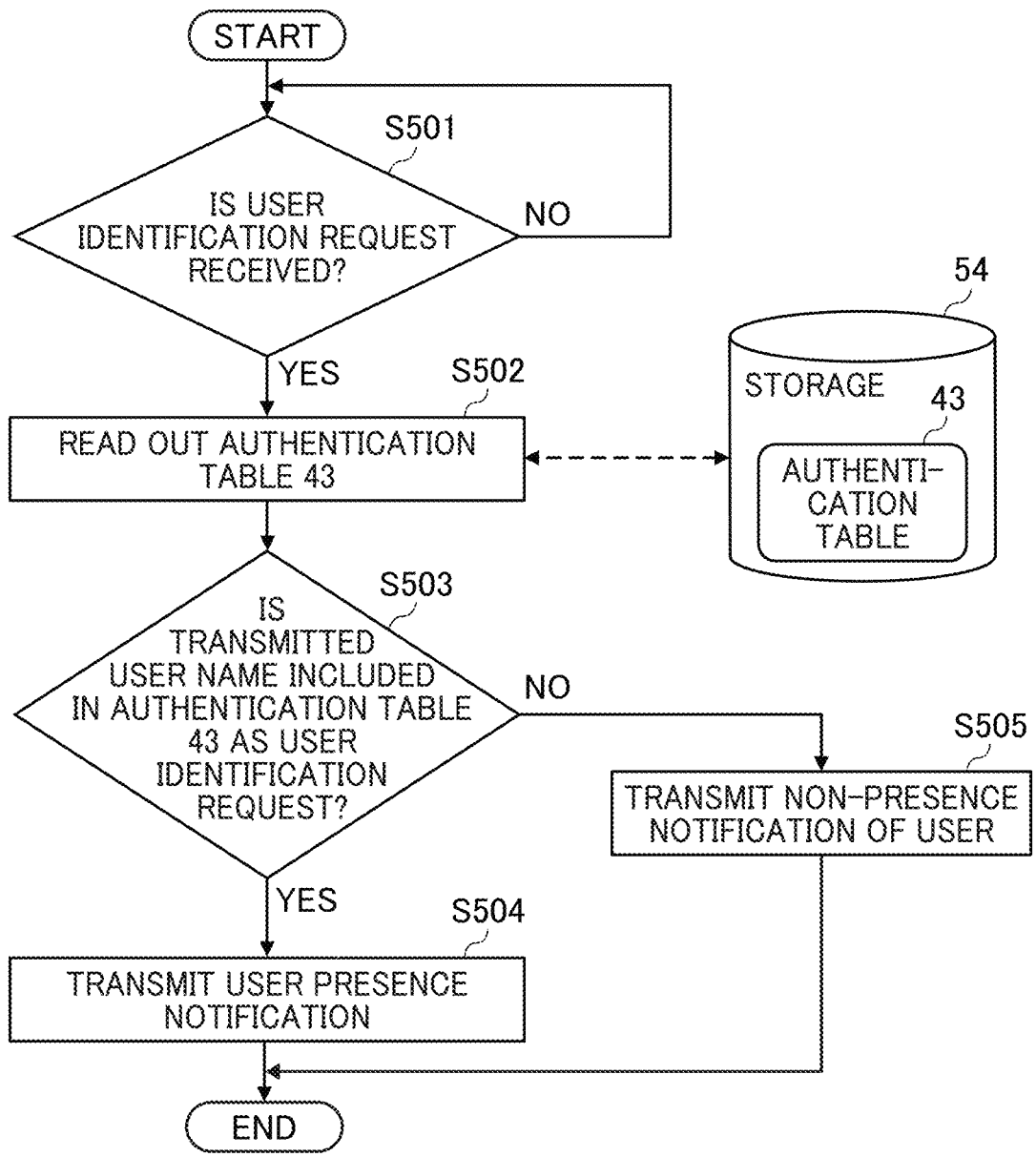
FIG. 16 is a flowchart illustrating an example of a user authentication process, performed by an authentication server, according to the second embodiment.

Here, the authentication process of the user, performed by the authentication server 50, according to the second embodiment is described. FIG. 16 is a flowchart illustrating an example of the user authentication process in the authentication server according to the second embodiment. In step S501, in response to receiving a user identification request from the network device 10, the transmitter/receiver 51 of the authentication server 50 proceeds the process to step S502. In this case, the transmitter/receiver 51 outputs the received user identification request to the authenticator 52.

The authentication server 50 repeats the process of step S501 until the user identification request is received from the network device 10. In step S502, in response to detecting the output user identification request, the authenticator 52 of the authentication server 50 reads out the authentication table 43 stored in the memory 54.

In step S503, the authenticator 52 of the authentication server 50 performs user identification based on the read authentication table 43 and user information included in the user identification request. When the user information transmitted as the user identification request is included in the authentication table 43, the authenticator 52 proceeds the process to step S504.

In step S504, the transmitter/receiver 51 of the authentication server 50 transmits a presence notification of the user to the network device 10. In particular, when the user information included in the user identification request is included in the read authentication table 43, the authenticator 52 recognizes that the user is a registered user and outputs a presence notification of the user to the transmitter/receiver 51. In response to detecting the output presence notification of the user, the transmitter/receiver 51 outputs a presence notification of the user to the network device 10.

In step S503, when the user information transmitted as the user identification request is not included in the authentication table 43, the authenticator 52 of the authentication server 50 proceeds the process to step S505. In step S505, the transmitter/receiver 51 of the authentication server 50 transmits a non-presence notification of the user to the network device 10. In particular, when the user information included in the user identification request is not included in the read authentication table 43, the authenticator 52 recognizes that the user has not registered and outputs a non-presence notification of the user to the transmitter/receiver 51. In response to detecting the output non-presence notification of the user, the transmitter/receiver 51 outputs a non-presence notification of the user to the network device 10.

Referring back to FIG. 15, description of the authentication process, performed by the network system, according to the second embodiment is continued. In step S410, since the authentication server 50*a* has no user information about a user whose user name is "hanako" in the authentication table 43*a*, the authentication server 50*a* transmits a non-presence notification of the user to the second transmitter/receiver 12 of the network device 10. As the user identification process in the authentication server 50*a*, the process illustrated in FIG. 16 is performed.

In step S411, the second transmitter/receiver 12 of the network device 10 outputs, to the first authentication requester 61, a non-presence notification of a user received from the authentication server 50*a*. In step S412, the first authentication requester 61 of the network device 10 reads out, with respect to the selector 14, information on the authentication server 50. In particular, since an identification result of the user in the authentication server 50*a* is the non-presence notification of the user, the first authentication requester 61 reads out, with respect to the selector 14, to acquire information on the authentication server 50 with the next highest priority to the authentication server 50*a*.

In step S413, in response to detecting the readout of information on the authentication server 50 from the first authentication requester 61, the selector 14 of the network device 10 selects an authentication server 50. In particular, the selector 14 selects an authentication server 50 with the next highest priority to the authentication server 50*a* included in the authentication server list 41. Because the authentication server 50 with the next highest priority to the authentication server 50*a* is the authentication server 50*b* in the authentication server list 41 illustrated in FIG. 7, the selector 14 selects the authentication server 50*b*.

In step S414, the selector 14 of the network device 10 outputs information on the authentication server 50 that is the selection result to the first authentication requester 61. In particular, the selector 14 outputs information on the authentication server 50*b* that is the selection result to the first authentication requester 61. In step S415, the first authentication requester 61 of the network device 10 outputs, to the third transmitter/receiver 13, a transmission instruction of the user identification request to the authentication server 50*b*.

In step S416, the third transmitter/receiver 13 of the network device 10 transmits a user identification request to the authentication server 50*b*. In particular, the third transmitter/receiver 13 transmits, to the authentication server 50*b*, user information included in the authentication request from the input/output device 30. In step S417, since the authentication server 50*b* has user information about a user whose user name is "hanako" in the authentication table 43*b*, the authentication server 50*b* transmits the presence notification of the user to the third transmitter/receiver 13 of the network device 10. As the user identification process in the authentication server 50*b*, the process illustrated in FIG. 16 is performed.

In step S418, the third transmitter/receiver 13 of the network device 10 outputs, to the second authentication requester 62, the presence notification of the user received from the authentication server 50*b*. In step S419, the second authentication requester 62 of the network device 10 outputs, to the third transmitter/receiver 13, a transmission instruction of the authentication request to the authentication server 50*b*. In step S420, the third transmitter/receiver 13 of the network device 10 transmits the authentication request of the user to the authentication server 50*b*.

In step S421, since authentication information on a user whose user name is "hanako" is included in the authentication table 43*b*, the authentication server 50*b* transmits an authentication success notification to the third transmitter/receiver 13 of the network device 10. As the authentication process in the authentication server 50*b*, the process illustrated in FIG. 10 is performed. In step S422, the third transmitter/receiver 13 of the network device 10 outputs, to the second authentication requester 62, an authentication success notification received from the authentication server 50*b*. In step S423, the second authentication requester 62 of the network device 10 outputs the authentication success notification to the first transmitter/receiver 11.

In step S424, the first transmitter/receiver 11 of the network device 10 transmits the authentication success notification to the input/output device 30. When the input/output device 30 receives the authentication success notification, the display controller 33 causes the operation device 320 to display a notification indicating the authentication success with characters and images. Then, the authentication process of the user "hanako" of the input/output device 30 is completed. The input/output device 30 authenticated by the authentication server 50*b* now can exchange data with the job server 70*b* or the user PC 90*b* illustrated in FIG. 1.

Figure 17:
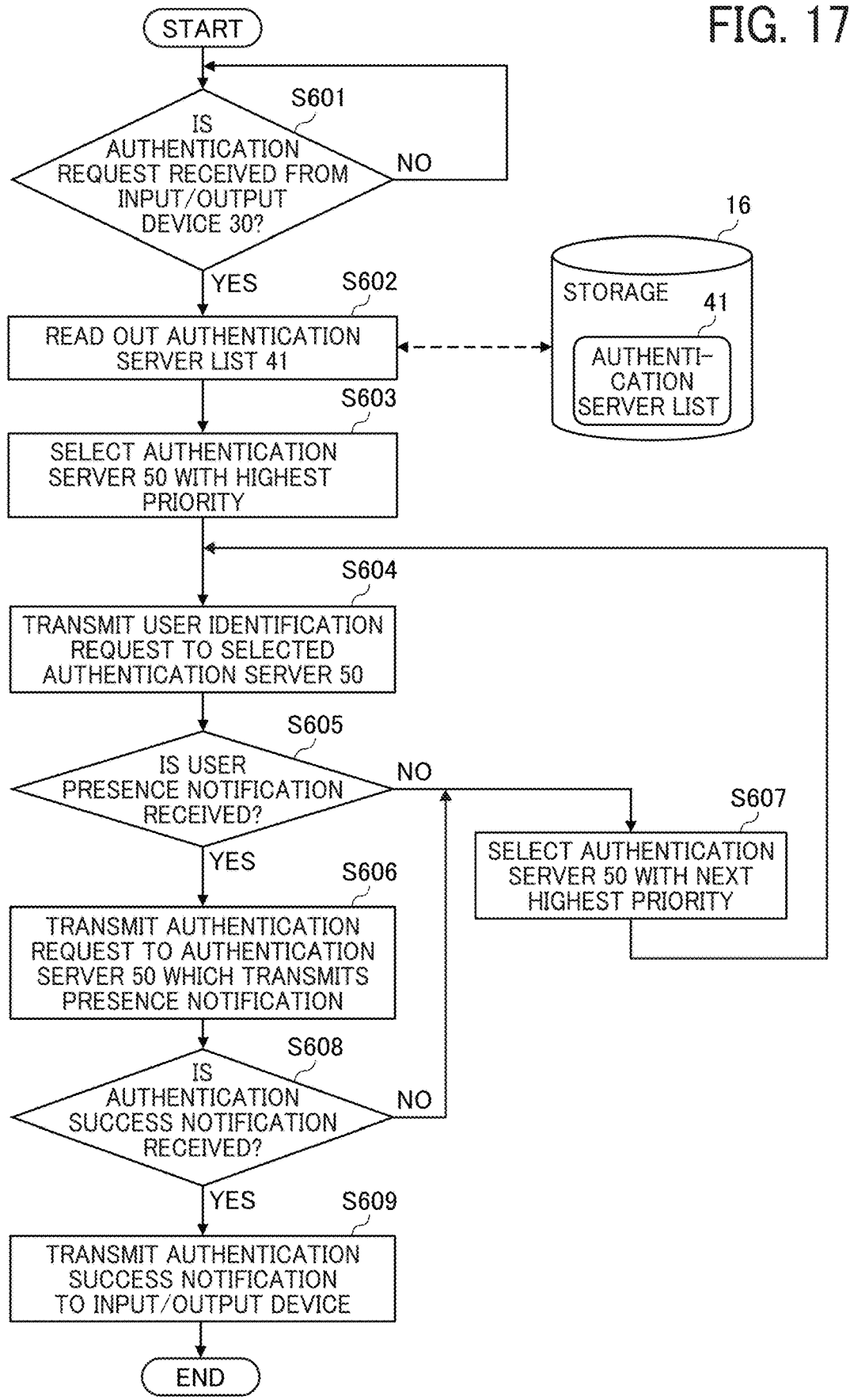
FIG. 17 is a flowchart illustrating an example of a selection process, performed by a network device, according to the second embodiment.

FIG. 17 is a flowchart illustrating an example of a selection process, performed by the network device, according to the second embodiment. Because the processes of steps S601 to S603 illustrated in FIG. 17 are the same as the processes of steps S301 to S303 illustrated in FIG. 12, description thereof is omitted. In the processes up to step S603, the authentication server 50 with the highest priority included in the authentication server list 41 has been selected by the selector 14 of the network device 10.

In step S604, the network device 10 transmits the user identification request to the authentication server 50 selected by the selector 14. In step S605, when the network device 10 has received a presence notification of a user from the authentication server 50 that is a transmission destination of the user identification request, the network device 10 proceeds the process to step S606. In step S606, the network device 10 transmits, to the authentication server 50 to which the presence notification of the user has been transmitted, an authentication request transmitted from the input/output device 30.

In step S605, when the network device 10 has not received a presence notification of a user from the authentication server 50 that is a transmission destination of a user identification request, that is, when the network device 10 has received a non-presence notification of a user, the network device 10 proceeds the process to step S607. In step S607, the network device 10 selects an authentication server 50 with the next highest priority to the authentication server 50 that has transmitted the non-presence notification of the user included in the authentication server list 41, and repeats the process from step 604.

In step S608, in response to receiving an authentication success notification from the authentication server 50 that has transmitted the authentication request, the network device 10 proceeds the process to step S609. In step S609, the network device 10 transmits the authentication success notification to the input/output device 30. In step S608, in response to receiving an authentication failure notification from the authentication server 50 that has transmitted the authentication request, the network device 10 proceeds the process to step S607, and transmits the user identification request to another authentication server 50.

In a typical authentication protocol, a user name is transmitted in a plaintext and a password is coded or hashed. Therefore, the network device 10 working as an authentication proxy can easily extract a user name from an authentication request.

Also, when the entire authentication process from the authentication request to the notification of the authentication result is operated on an encrypting protocol such as the Transport Layer Security (TLS), the network device 10 may terminate the TLS, and the network device 10 can extract the user name from the authentication request. The phrase "the network device 10 terminates the TLS" indicates that a TLS session is established independently between the input/output device 30 and the network device 10, and between the network device 10 and the authentication server 50, respectively.

As discussed above, the network system according to the second embodiment, before transmitting the authentication request including the authentication information to the authentication server 50, confirms presence of the user with respect to the authentication server 50 by using the user name included in the authentication information. Therefore, in the network system according to the second embodiment, by avoiding transmission of authentication information to an authentication server 50 that does not manage authentication information of a user who makes an authentication request, security can be strengthen.

Third Embodiment

Next, a configuration of a network system according to a third embodiment is described. A network device 10 according to the third embodiment stores information on an authentication server 50 that can be used by a user and information of a user name that is to be user information beforehand. Therefore, in the network system according to the third embodiment, as in the second embodiment, by avoiding transmission of authentication information to an authentication server 50 that does not manage authentication information of a user who makes an authentication request, security can be strengthen.

The authentication server list 41b stored in the storage 16 of the network device 10 is described. FIG. 18 is a diagram illustrating an example of an authentication server list according to the third embodiment. The authentication server list 41b illustrated in FIG. 18 includes, instead of the information on priority included in the authentication server list 41 illustrated in FIG. 7, information of the user name that is the user information about the user who can be authenticated by the authentication server 50. Information about the user name that is the user information is an example of condition information with which the network I/F used for transmitting the authentication request is associated. In the authentication server list 41b, the user name, the IP address of the authentication server 50, the network I/F used in the communication with the authentication server 50 are listed in correlation with each other for each authentication server 50.

The user name indicates a user who can perform a user authentication process in the authentication server 50 corresponding to the IP address of the authentication server 50 associated with the information of the user name in the list. That is, the user name is associated with the authentication server 50 in which the same user name is stored in the authentication table 43. The IP address of the authentication server 50 and the information of the network I/F to be used in the communication with the authentication server 50 are the same as those in the authentication server list 41 illustrated in FIG. 7.

In the example of FIG. 18, a user whose user name is "taro" or "jiro" is subject to an authentication process performed using the NIC_A 106a in the authentication server 50a of which IP address is "192.168.1.4." A user whose user name is "hanako" or "kaori" is subject to an authentication process performed by using the NIC_B 106b in the authentication server 50b of which IP address is "192.168.2.4." A user whose user name does not exist in the authentication server list 41b is subject to an authentication process performed by using the NIC_A 106a in the authentication server 50a of which IP address is "192.168.1.4."

The authentication server list 41b may include information about priority as the authentication server list 41 illustrated in FIG. 7. In this case, the authentication server list 41b stores information about a plurality of authentication servers 50 correlated with a single user name. Then, the network device 10 selects an authentication server 50 with the highest priority included in the authentication server list 41b from among the authentication servers 50 that the user can use.

A process for a user whose user name does not exist in the authentication server list 41b is not limited to the process above, and an authentication server 50 may be selected by using the process illustrated in the first embodiment or the second embodiment. Furthermore, the network device 10 may promptly notify a user whose user name does not exist in the authentication server list 41b of an authentication failure.

Authentication Process

Figure 19:
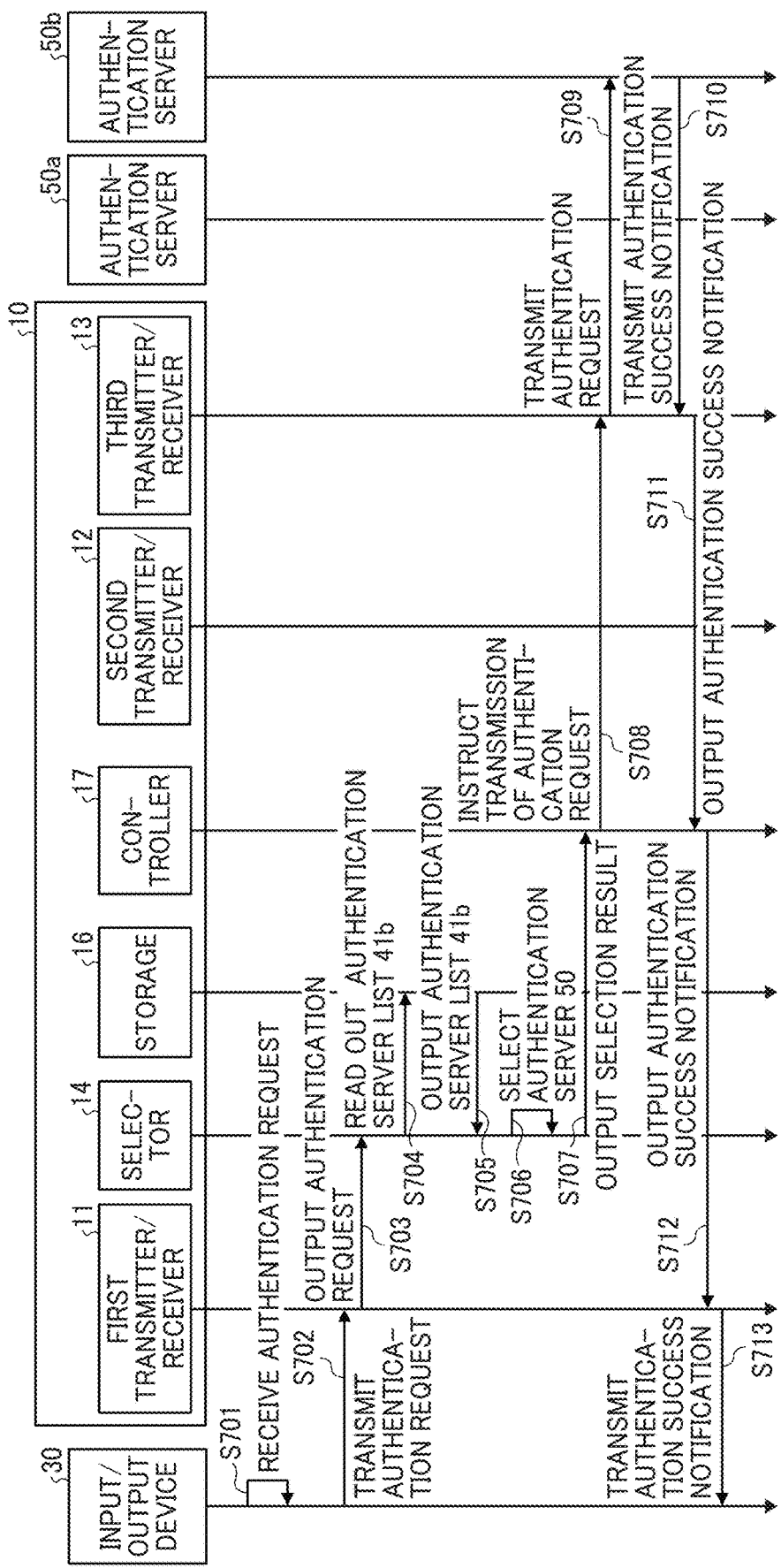
FIG. 19 is a sequence diagram illustrating an example of an authentication process, performed by a network system, according to the third embodiment.

Next, an authentication process performed by the network system according to the third embodiment is described. FIG. 19 is a sequence diagram illustrating an example of the authentication process performed by the network system according to the third embodiment. In FIG. 19, as in the processes illustrated in FIGS. 10 and 15, a case in which an authentication process of a user whose user name is "hanako" as illustrated in FIG. 9B is described. Because the processes of steps S701 to S703 illustrated in FIG. 19 are the same as the processes of steps S101 to S103 illustrated in FIG. 10, description thereof is omitted.

In step S704, upon receiving an authentication request, the selector 14 of the network device 10 reads out the authentication server list 41b stored in the storage 16. In particular, the selector 14 outputs a readout request of the authentication server list 41b to the storing/reading unit 15. Upon detecting the output readout request, the storing/reading unit 15 reads out the authentication server list 41b stored in the storage 16.

In step S705, the storage 16 of the network device 10 outputs the authentication server list 41b to the selector 14. In particular, the storage 16 outputs the authentication server list 41b to the storing/reading unit 15. The storing/reading unit 15 outputs the authentication server list 41b to the selector 14.

In step S706, the selector 14 of the network device 10 selects an authentication server 50 that transmits an authentication request based on user information included in the authentication request transmitted from the input/output device 30 and user information corresponding to the authentication server 50 included in the authentication server list 41b. In particular, the selector 14 selects an authentication server 50 correlated with the same user name, included in the authentication server list 41b, as the user name included in the authentication request as an authentication server 50 that transmits an authentication request. In the authentication server list 41b illustrated in FIG. 18, the user name "hanako" is stored in association with the authentication server 50b and, therefore, the selector 14 selects the authentication server 50b as the authentication server 50 that transmits an authentication request.

In step S707, the selector 14 of the network device 10 outputs information on authentication server 50 that is selection result to controller 17. In particular, the selector 14 outputs, to the controller 17, information on the authentication server 50b that is the selection result. In step S708, the controller 17 of the network device 10 outputs, to the third transmitter/receiver 13, a transmission instruction of the authentication request to the authentication server 50b. In step S709, the third transmitter/receiver 13 of the network device 10 transmits, to the authentication server 50b, the authentication request of the user.

In step S710, because the authentication server 50b has authentication information of a user whose user name is "hanako" in the authentication table 43b, the authentication server 50b transmits an authentication success notification to the third transmitter/receiver 13 of the network device 10. As the authentication process in the authentication server 50b, the process illustrated in FIG. 10 is performed. In step S711, the third transmitter/receiver 13 of the network device 10 outputs, to the controller 17, the authentication success notification received from the authentication server 50b. In step S712, the controller 17 of the network device 10 outputs the authentication success notification to the first transmitter/receiver 11.

In step S713, the first transmitter/receiver 11 of the network device 10 transmits the authentication success notification to the input/output device 30. When the input/output device 30 receives the authentication success notification, the display controller 33 causes the operation device 320 to display the notification indicating the authentication success with characters and images. Then, the authentication process of the user "hanako" of the input/output device 30 is completed. The input/output device 30 authenticated by the authentication server 50b now can exchange data with the job server 70b or the user PC 90b illustrated in FIG. 1.

As discussed above, in the network system according to the third embodiment, the network device 10 stores information on an authentication server 50 that can be used by a user and user information beforehand. Therefore, in the network system according to the third embodiment, as in the second embodiment, by avoiding transmission of authentication information to an authentication server 50 that does not manage authentication information about a user who makes an authentication request, security can be strengthen.

Alternative Embodiments

Next, an information processing control system according to alternative embodiments is described. In network systems according to alternative embodiments, configurations of the first embodiment to the third embodiment are applied to parts except for the configurations discussed below.

Alternative Embodiment (1)

Figure 20:
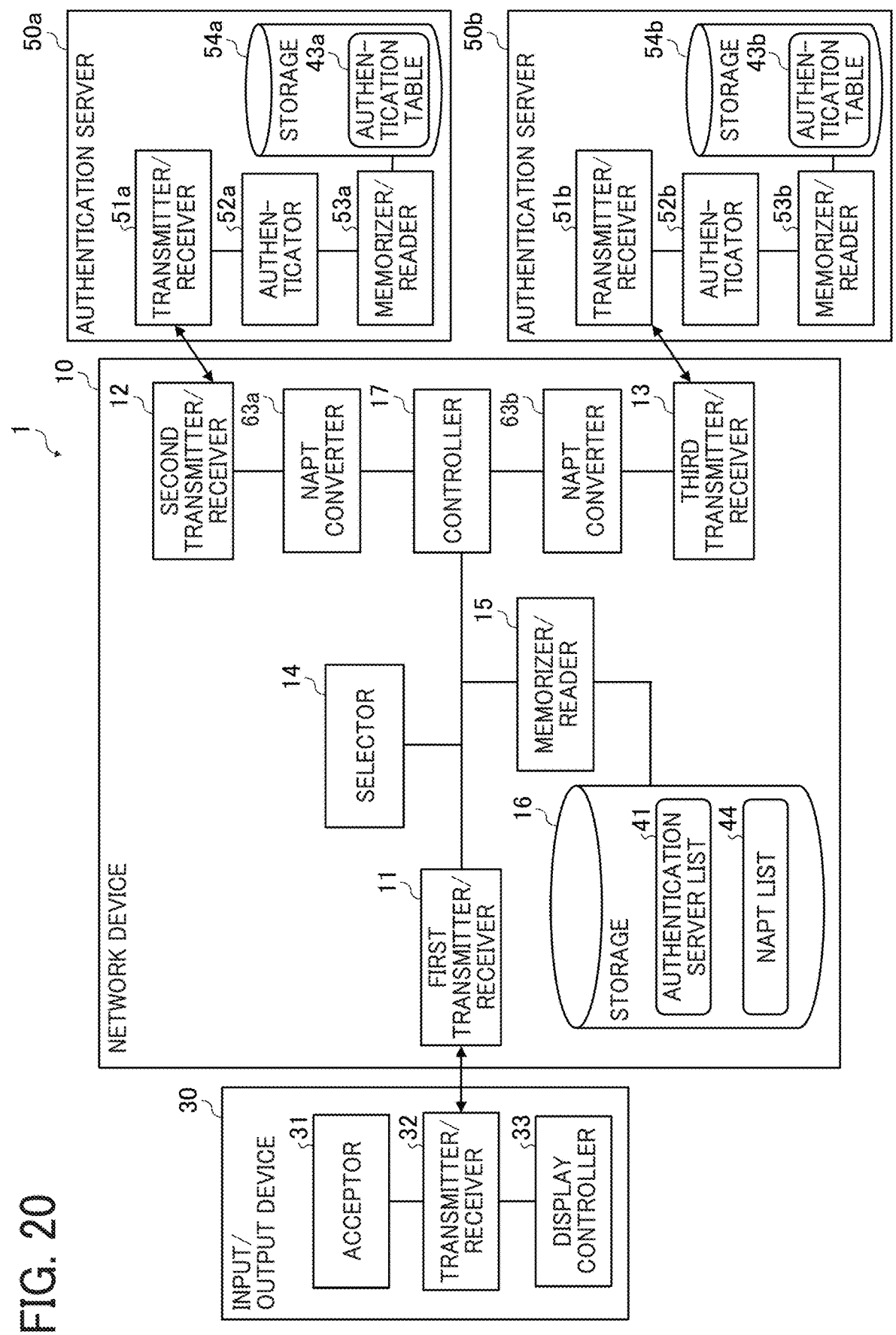
FIG. 20 is a diagram illustrating an example of a function configuration of a network system according to an alternative embodiment.

FIG. 20 is a diagram illustrating an example of a function configuration of a network system according to an alternative embodiment (1). The network device 10 illustrated in FIG. 20 includes a Network Address Port Translation (NAPT) converter 63a instead of a bridge connector 18 and a NAPT converter 63b instead of a NAT converter 19. The NAPT converter 63a is an example of a first NAPT converter, and the NAPT converter 63b is an example of a second NAPT converter.

The NAPT converter 63a and the NAPT converter 63b are functions to interconvert IP addresses and port numbers of packets working in the IP layer (a layer 3) of the OSI. The NAPT converter 63a and the NAPT converter 63b interconvert IP addresses based on a NAPT table 44a and a NAPT table 44b. The NAPT converter 63a and the NAPT converter 63b are implemented by, for example, programs executed by the CPU 101 illustrated in FIG. 3.

Here, details of the NAPT table 44 are described. FIGS. 21A and 21B illustrate examples of the NAPT tables. FIG. 21A illustrates an example of the NAPT table 44a that is referred to by the NAPT converter 63a. The IP addresses are converted in the same manner as in the NAT table 42b of FIG. 8B. A port number before conversion is a port number (CCAA) which the network device 10 sets as a destination of a packet, and a port number after conversion is a port number (XXAA) of a destination when a packet is transmitted to the authentication server 50a.

FIG. 21B illustrates an example of the NAPT table 44b that is referred to by the NAPT converter 63b. FIG. 21B is the same as FIG. 21A except that the authentication server is 50a in FIG. 21A and is 50b in FIG. 21B.

When a packet of which destination is the IP address of "192.168.1.5" and a port number (CCAA) of the NIC_A 106a of the network device 10 is transmitted from the input/output device 30 connected to network C 23, the NAPT converter 63a refers to the NAPT table 44a and converts the IP address of the destination into the IP address "192.168.1.4" of the authentication server 50*a*. The NAPT converter 63*a* also converts the port number (CCAA) of the destination of the packet into a port number (XXAA) that is the port number of the authentication server 50*a*.

The authentication server 50*a* connected to the network A 21 transmits (replies) a packet of which destination is the IP address "192.168, 1.2" and a port number (AAAA) of the input/output device 30, and of which transmission source is the IP address "192.168.1.4" and the port number (XXAA) of the authentication server 50*a*. The NAPT converter 63*a* converts the IP address "192.168.1.4" of the transmission source into the IP address "192.168.1.5" of the NIC_A 106*a* of the network device 10, and converts the port number of the transmission source into the port number (CCAA) of the NIC_A 106*a* of the network device 10. The NAPT converter 63*b* refers to the NAPT table 44*b* illustrated in FIG. 21B and processes, however, the order of the steps is the same as in the NAPT converter 63*a*.

Alternative Embodiment (2)

In a network system according to an alternative embodiment (2), a network device 10 is provided inside of an input/output device 30, and the network device 10 and the input/output device 30 are integrated with each other.

Figure 22:
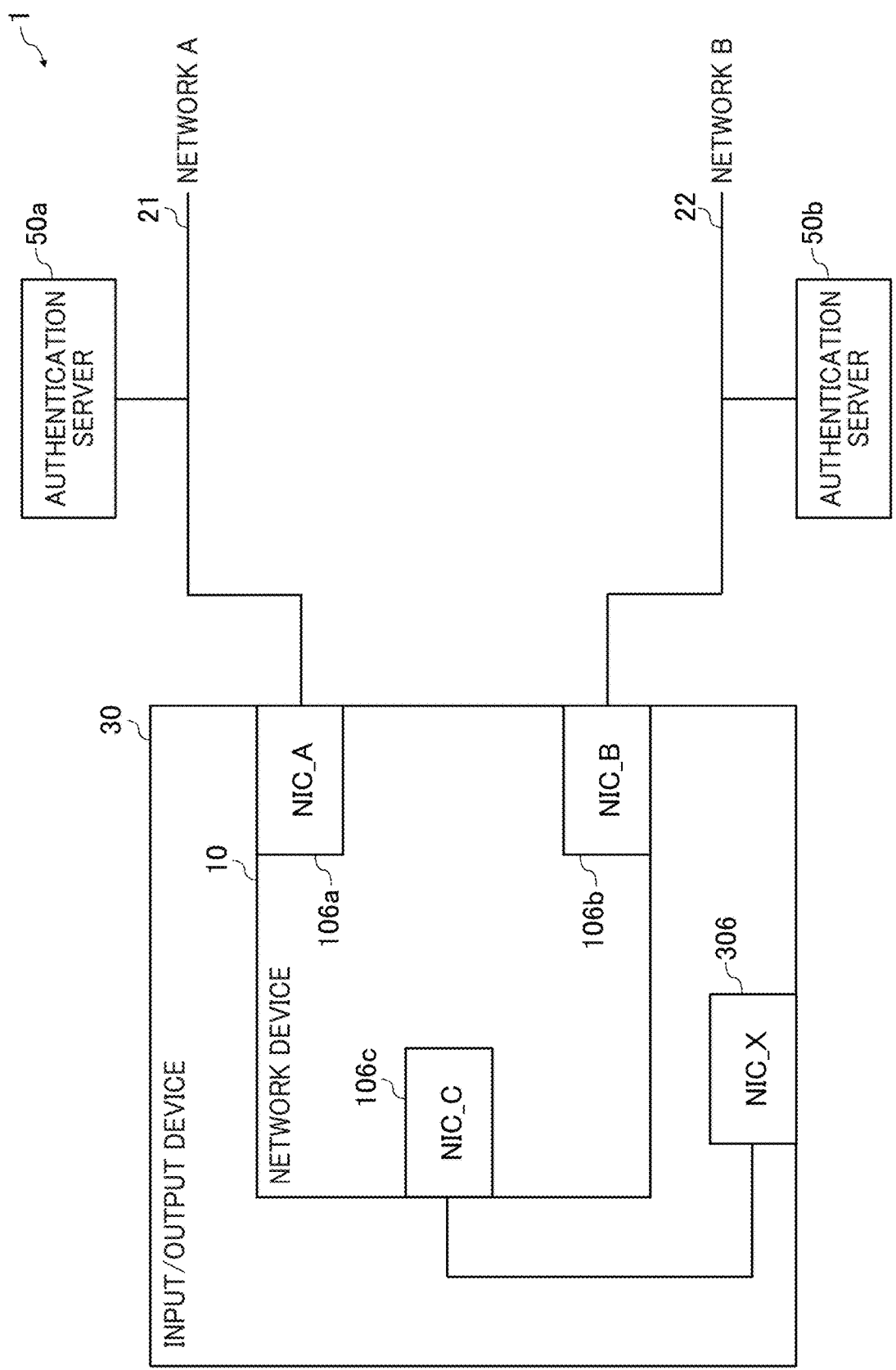
FIG. 22 is a diagram illustrating an example of an input/output device including a network device according to another alternative embodiment.

FIG. 22 is a diagram illustrating an example of an input/output device including a network device according to the alternative embodiment (2). The network device 10 provided integrally with the input/output device 30 opens interfaces of the NIC_A 106*a* and the NIC_B 106*b* outside and is connected to the network A 21 and the network B 22. The NIC_C 106*c* is connected to NIC_X 306 that the input/output device 30 originally has. Therefore, even when the network device 10 and the input/output device 30 are integrated with each other, the network device 10 can perform the same process as in the present embodiment.

The network device according to one or more embodiments described above includes the second transmitter/receiver 12 and the third transmitter/receiver 13, each can communicate with corresponding one of the authentication servers 50 by using corresponding one of the plurality of network I/Fs connected to the authentication server 50 on different communication networks. In response to receiving an authentication request from the input/output device 30 on network C, the network device 10 selects an authentication server 50 to be a transmission destination of the authentication request based on condition information associated with the network I/Fs, and controls transmission of the authentication request to the selected authentication server 50. Based on an authentication result that is a reply to the authentication request, the network device 10 controls transmission of authentication information to the input/output device 30. Accordingly, even when an authentication server 50 is provided in each network, the network device 10 is able to perform user authentication requested by the input/output device 30 via the network device 10 using a selected authentication server 50.

The functions of each embodiment may be implemented by computer-executable programs described in legacy programming languages or object-oriented programming languages, such as Assembler, C, C, C++, C#, and Java (registered trademark). The functions may be distributed on a machine-readable recording medium, such as ROM, electrically erasable programmable read-only memory (EEPROM), erasable programmable read-only memory (EPROM), flash memory, flexible disc, a CD (compact disc)-ROM, CD-RW (re-writable), DVD-ROM, DVD-RAM, DVD-RW, a Blu-ray disc, an SD card, and a magneto-optical disc (MO), or distributed via a telecommunication line.

Some or all of the functions of each embodiment may be implemented, for example, by a programmable device (PD) such as a field programmable gate array FPGA), or may be implemented as an application specific integrated circuit (ASIC). These functions may be distributed on a recording medium as circuit structure data (bit stream data) to be downloaded on a PD to implement functions of each embodiment on the PD, or the data may be described as a hardware description language (HDL), a very high speed integrated circuits hardware description language (VHDL), Verilog-HDL, and so forth for generating circuit structure data.

The network device, the information processing apparatus (input/output device), the authentication method, and the recording medium according to one or more embodiments of the present invention are described. However, embodiments of the present invention are not limited to those described above. Other embodiments, additions, changes, removals, and so forth may be made within the range which a person skilled in the art occurs to. Any embodiments having the effects and operations of the present invention fall within the range of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A network device comprising:
a plurality of network interfaces respectively connected to a plurality of authentication servers on a plurality of communication networks; and
processing circuitry configured to cause the network device to,
select a first authentication server, of the plurality of authentication servers, based on condition information associated with the plurality of network interfaces, in response to receiving an authentication request from an information processing apparatus,
request the first authentication server to determine whether a user is registered to the communication network of the first authentication server by transmitting user information included in the authentication request to the first authentication server,
transmit, in response to receiving a presence notification from the first authentication server, the authentication request to the first authentication server using a respective communication network, of the plurality of communication networks, associated with the first authentication server, the presence notification indicating that the user identified by the user information is registered to the communication network of the first authentication server, receive an authentication result from the first authentication server, request, in response to the authentication result received from the first authentication server indicating an authentication failure or in response to receiving a non-presence notification from the first authentication server, a second authentication server of the plurality of authentication servers different from the first authentication server to determine whether a user identified by the user information is registered to a respective communication network, of the plurality of communication networks, associated with the second authentication server by transmitting the user information to the second authentication server, wherein the non-presence notification indicates that the user information has not been registered to the communication network of the first authentication server, and the second authentication server is on a different communication network than the first authentication server, transmit the authentication request to the second authentication server in response to receiving a presence notification from the second authentication server, and control transmission of authentication information to the information processing apparatus, based on the authentication result.

2. The network device according to claim 1, wherein the processing circuitry is configured to cause the network device to:

transmit the authentication information to the information processing apparatus in response to the authentication result indicating an authentication success.

3. The network device according to claim 1, wherein the condition information includes priority information indicating a priority of each of the plurality of authentication servers, and the processing circuitry is configured to cause the network device to, select the first authentication server based on the priority information.

4. The network device according to claim 3, wherein the processing circuitry is configured to cause the network device to, select the first authentication server based on the first authentication server having a highest priority of the plurality of authentication servers based on the priority information, and select the second authentication server based on the second authentication server having a second highest priority of the plurality of authentication servers based on the priority information.

5. The network device according to claim 1, wherein the condition information includes confidentiality information of each of the plurality of communication networks, and the processing circuitry is configured to cause the network device to, select the first authentication server based on the authentication request and the confidentiality information.

6. The network device according to claim 5, wherein the authentication request includes attribute information of the information processing apparatus.

7. The network device according to claim 1, wherein the condition information includes user information of one or more users in association with respective authentication servers of the plurality of authentication servers capable of authenticating the respective users of the one or more users, and the processing circuitry is configured to cause the network device to, select the first authentication server based on the condition information.

8. The network device according to claim 1, further comprising:

a memory configured to store, connection information associating respective network interfaces of the plurality of network interfaces with respective authentication servers of the plurality of authentication servers connected with the respective network interfaces, and the condition information associated with the connection information.

9. The network device according to claim 1, wherein the processing circuitry is configured to cause the network device to:

receive the authentication request on a session of an encrypting protocol of Transport Layer Security (TLS), and terminate the session of the TLS.

10. The network device according to claim 1, wherein the plurality of network interfaces includes:

a first network interface configured to connect to the information processing apparatus via a first communication network;

a second network interface configured to connect to a third authentication server of the plurality of authentication servers via a second communication network; and a third network interface configured to connect to a fourth authentication server of the plurality of authentication servers different from the third authentication server via a third communication network.

11. The network device according to claim 10, wherein the processing circuitry is configured to cause the network device to:

bridge-connect the second communication network and the first communication network; and perform network address translation conversion between the third communication network and the first communication network.

12. The network device according to claim 10, wherein the processing circuitry is configured to cause the network device to:

perform network address port translation conversion between the second communication network and the first communication network; and perform network address port translation conversion between the third communication network and the first communication network.

13. An information processing apparatus comprising the network device according to claim 1.

14. A system comprising:

the network device of claim 1.

15. An authentication method performed by a network device connected with a plurality of network interfaces respectively connected to a plurality of authentication servers on a plurality of communication networks, the method comprising:

selecting a first authentication server of the plurality of authentication servers based on condition information associated with the plurality of network interfaces, in response to receiving an authentication request from an information processing apparatus;

requesting the first authentication server to determine whether a user is registered to the communication network of the first authentication server by transmitting user information included in the authentication request to the first authentication server;

transmitting, in response to receiving a presence notification from the first authentication server, the authentication request to the first authentication server using a respective communication network, of the plurality of communication networks, associated with the first authentication server, the presence notification indicating that the user identified by the user information is registered to the communication network of the first authentication server;

receiving an authentication result from the first authentication server;

requesting, in response to the authentication result received from the first authentication server indicating an authentication failure or in response to receiving a non-presence notification from the first authentication server, a second authentication server of the plurality of authentication servers different from the first authentication server to determine whether a user identified by the user information is registered to a respective communication network, of the plurality of communication networks, associated with the second authentication server by transmitting the user information to the second authentication server, wherein the non-presence notification indicates that the user information has not been registered to the communication network of the first authentication server, and the second authentication server is on a different communication network than the first authentication server;

transmitting the authentication request to the second authentication server in response to receiving a presence notification from the second authentication server; and controlling transmission of authentication information to the information processing apparatus, based on the authentication result.

16. A non-transitory recording medium storing a plurality of instructions which, when executed by one or more processors, cause a network device to perform an authentication method, the network device connected with a plurality of network interfaces respectively connected to a plurality of authentication servers on a plurality of communication networks, the method comprising:

selecting a first authentication server of the plurality of authentication servers based on condition information associated with the plurality of network interfaces, in response to receiving an authentication request from an information processing apparatus;

requesting the first authentication server to determine whether a user is registered to the communication network of the first authentication server by transmitting user information included in the authentication request to the first authentication server;

transmitting, in response to receiving a presence notification from the first authentication server, the authentication request to the first authentication server using a respective communication network, of the plurality of communication networks, associated with the first authentication server, the presence notification indicating that the user identified by the user information is registered to the communication network of the first authentication server;

receiving an authentication result from the first authentication server;

requesting, in response to the authentication result received from the first authentication server indicating an authentication failure or in response to receiving a non-presence notification from the first authentication server, a second authentication server of the plurality of authentication servers different from the first authentication server to determine whether a user identified by the user information is registered to a respective communication network, of the plurality of communication networks, associated with the second authentication server by transmitting the user information to the second authentication server, wherein the non-presence notification indicates that the user information has not been registered to the communication network of the first authentication server, and the second authentication server is on a different communication network than the first authentication server;

transmitting the authentication request to the second authentication server in response to receiving a presence notification from the second authentication server; and controlling transmission of authentication information to the information processing apparatus, based on the authentication result.

* * * * *